United States Patent
Mishima

(10) Patent No.: US 7,430,214 B2
(45) Date of Patent: Sep. 30, 2008

(54) CIRCUIT, METHOD AND PROGRAM FOR DATA QUEUE CONTROL

(75) Inventor: Masahiro Mishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 11/042,069

(22) Filed: Jan. 26, 2005

(65) Prior Publication Data

US 2006/0088045 A1 Apr. 27, 2006

(30) Foreign Application Priority Data

Oct. 22, 2004 (JP) ............................. 2004-307978

(51) Int. Cl.
*H04L 12/54* (2006.01)
*G01R 31/08* (2006.01)
*H04J 1/16* (2006.01)
*H04L 12/28* (2006.01)

(52) U.S. Cl. ................. 370/429; 370/229; 370/230; 370/231; 370/235; 370/412; 370/428

(58) Field of Classification Search ............. None
See application file for complete search history.

(56) References Cited

U.S. PATENT DOCUMENTS

| 5,357,622 | A | 10/1994 | Parks et al. |
| 2003/0128703 | A1 | 7/2003 | Zhao et al. |
| 2004/0156359 | A1 | 8/2004 | Nakagawa |

FOREIGN PATENT DOCUMENTS

| JP | 1-162954 | 6/1989 |
| WO | WO 03/043272 A1 | 5/2003 |

*Primary Examiner*—Wing F. Chan
*Assistant Examiner*—Blanche Wong
(74) *Attorney, Agent, or Firm*—Staas & Halsey LLP

(57) ABSTRACT

After packets received by receiving latches have been divided into individual words and the words have been stored into buffer queues, the packets read from the buffer queues are stored into packet storage queues. A format determining circuit has defined in advance a plurality of types of writing formats and, when a packet is received by any of the receiving latches, determines dynamically a writing format according to availability of the buffer queues at this time. Then, a packet control circuit divides the received packets into individual words and stores the words into the buffer queues, according to the determined writing format.

27 Claims, 41 Drawing Sheets

PRIOR ART
FIG. 3B
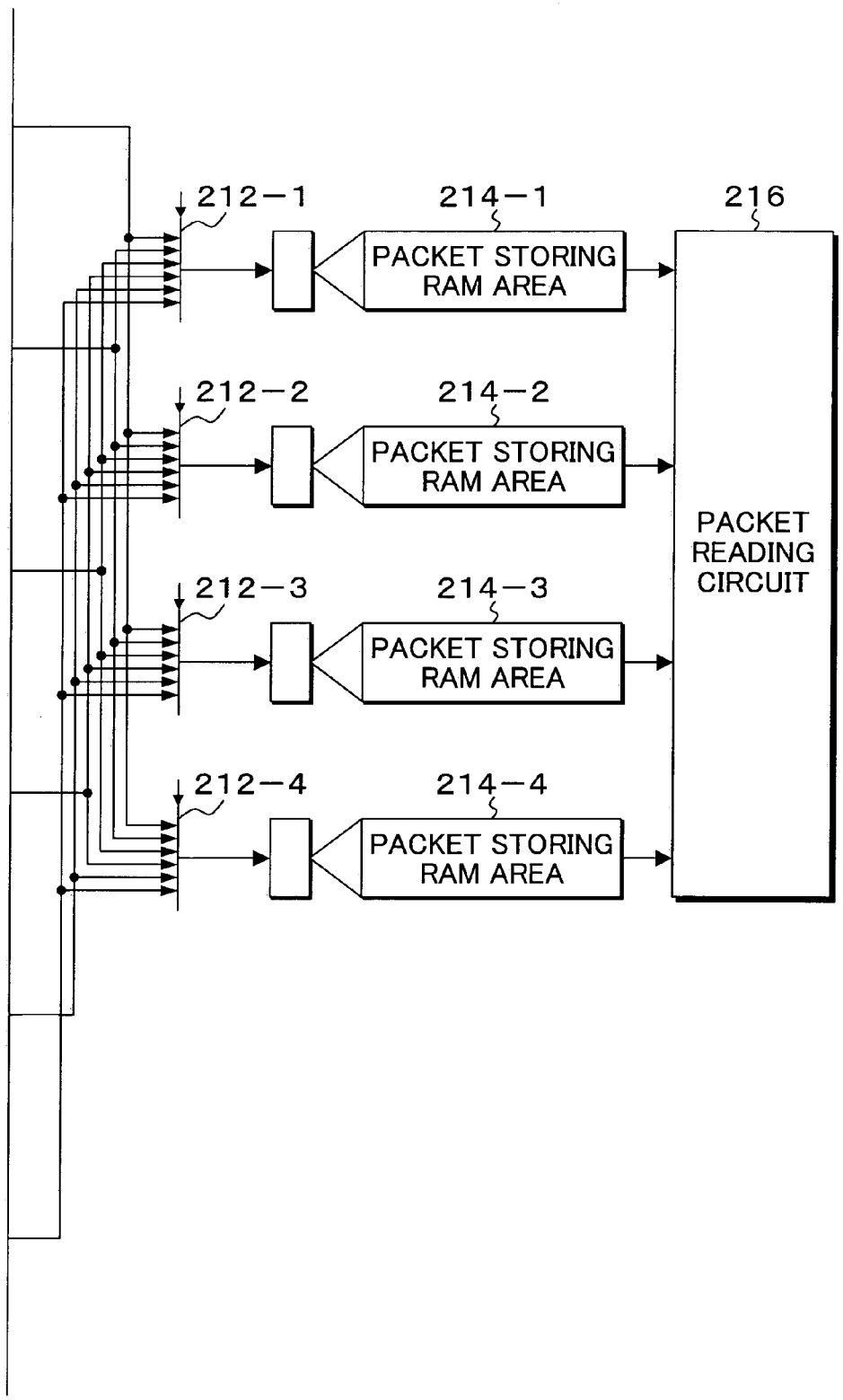

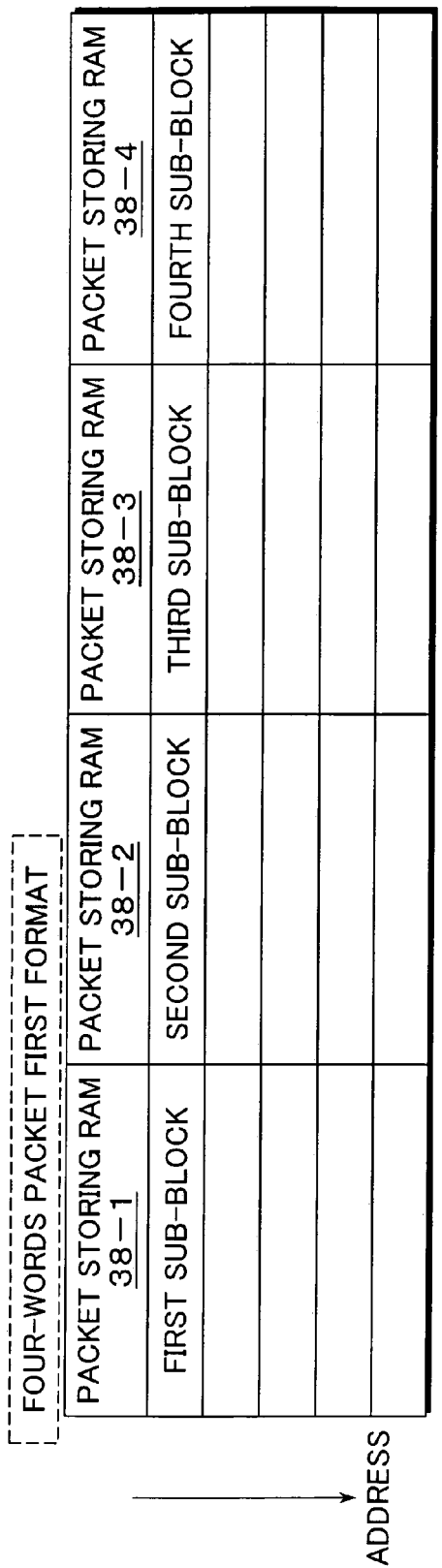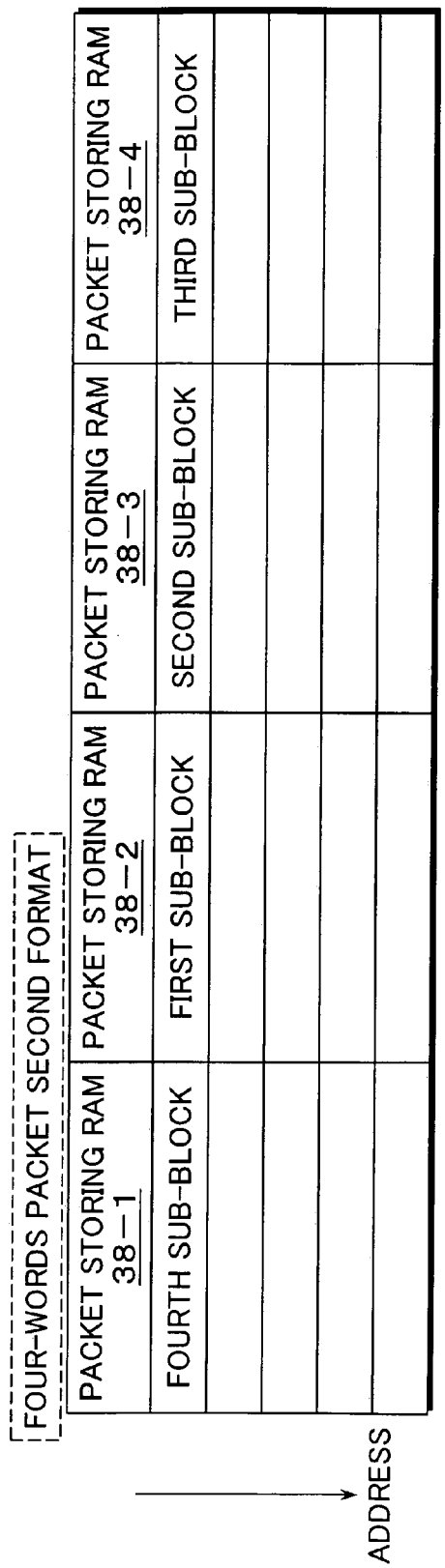

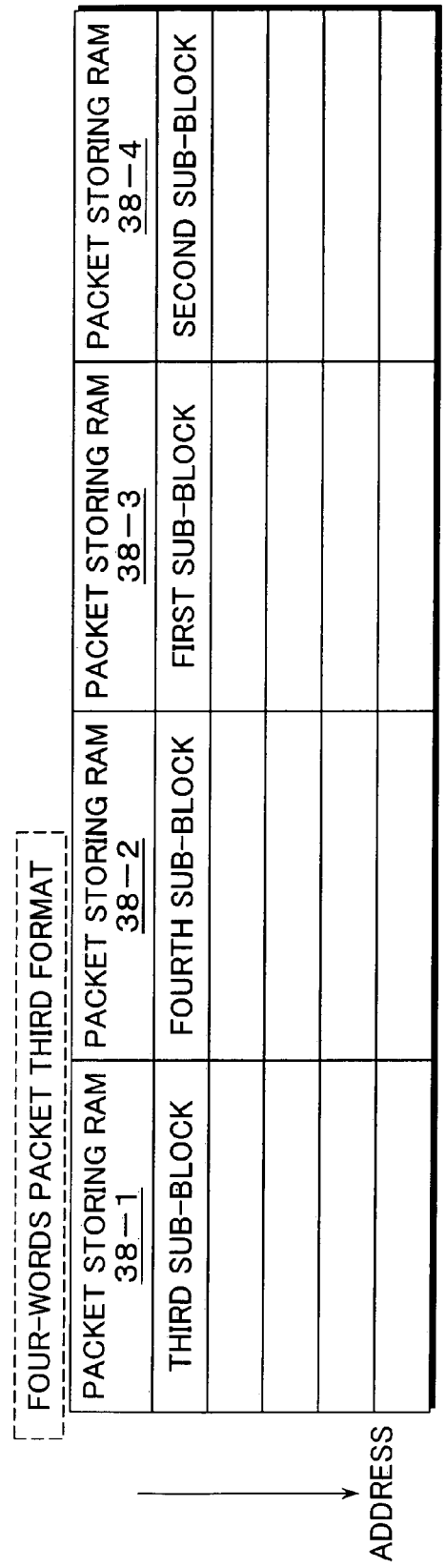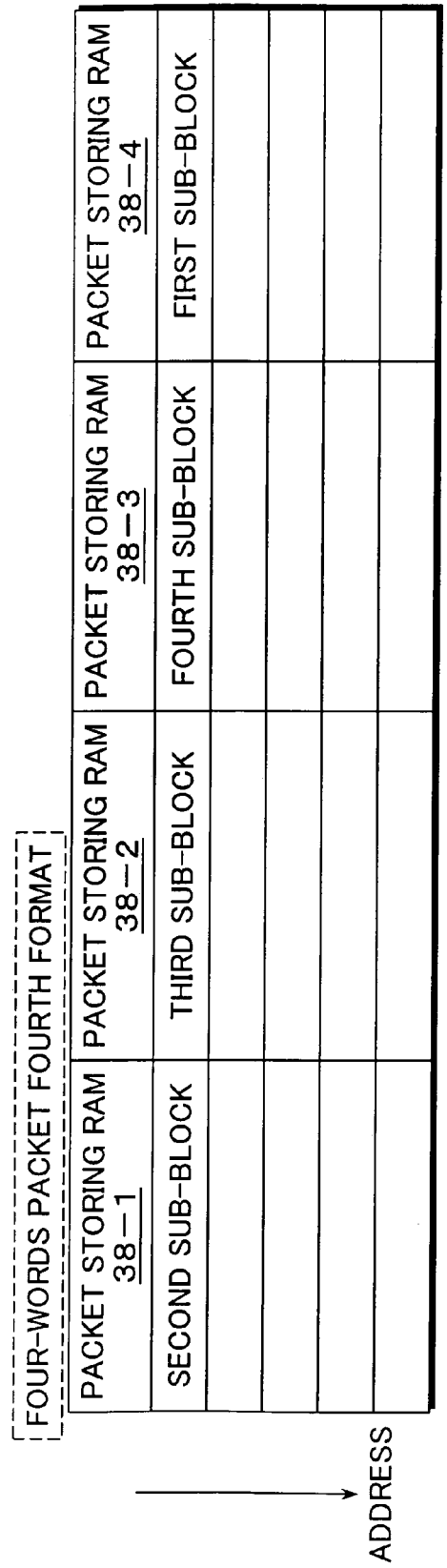

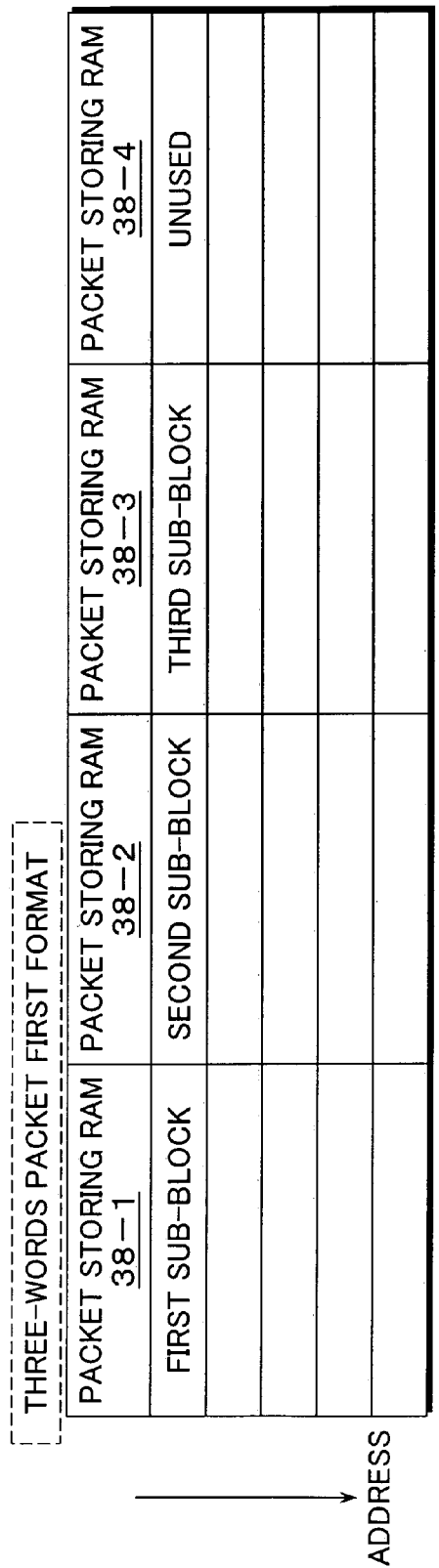
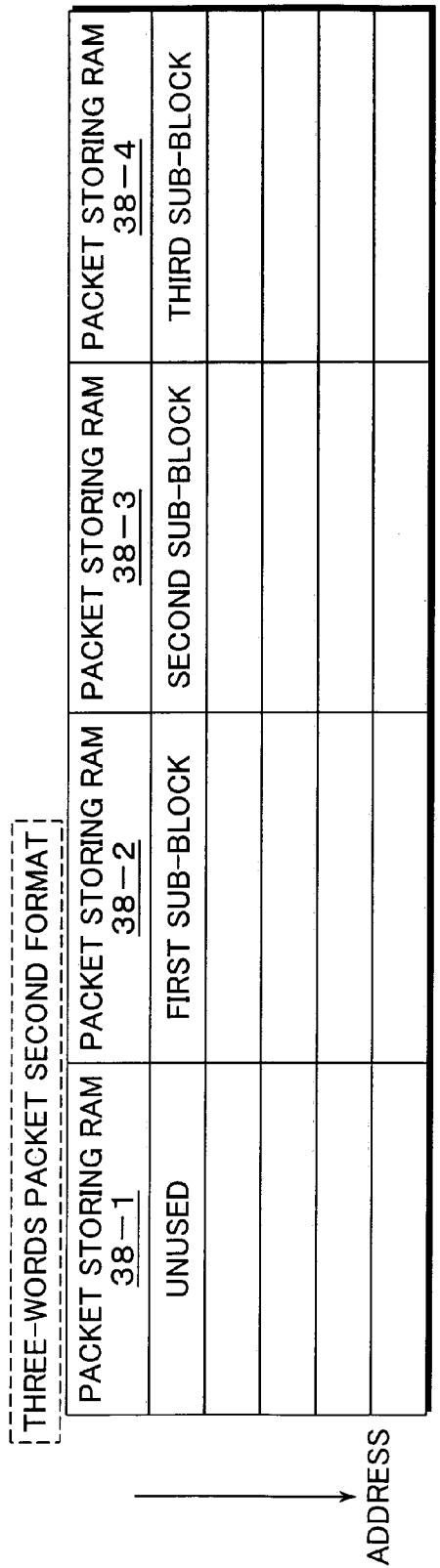

FIG. 8C

THREE-WORDS PACKET THIRD FORMAT

| PACKET STORING RAM 38-1 | PACKET STORING RAM 38-2 | PACKET STORING RAM 38-3 | PACKET STORING RAM 38-4 |
|---|---|---|---|
| THIRD SUB-BLOCK | UNUSED | FIRST SUB-BLOCK | SECOND SUB-BLOCK |
| | | | |
| | | | |
| | | | |

→ ADDRESS

FIG. 8D

THREE-WORDS PACKET FOURTH FORMAT

| PACKET STORING RAM 38-1 | PACKET STORING RAM 38-2 | PACKET STORING RAM 38-3 | PACKET STORING RAM 38-4 |
|---|---|---|---|
| SECOND SUB-BLOCK | THIRD SUB-BLOCK | UNUSED | FIRST SUB-BLOCK |
| | | | |
| | | | |
| | | | |

→ ADDRESS

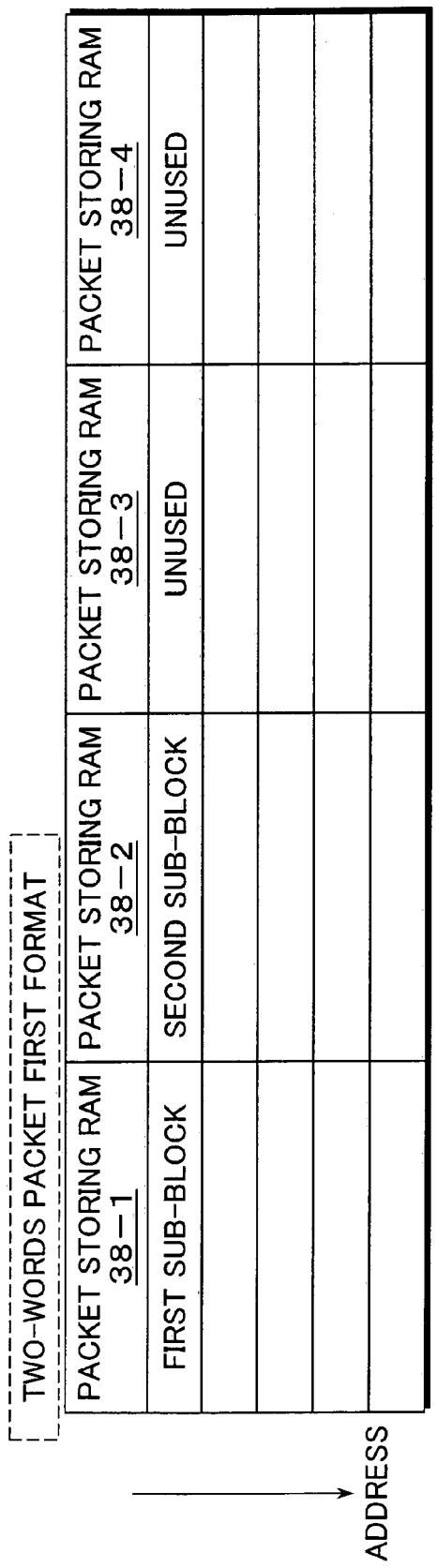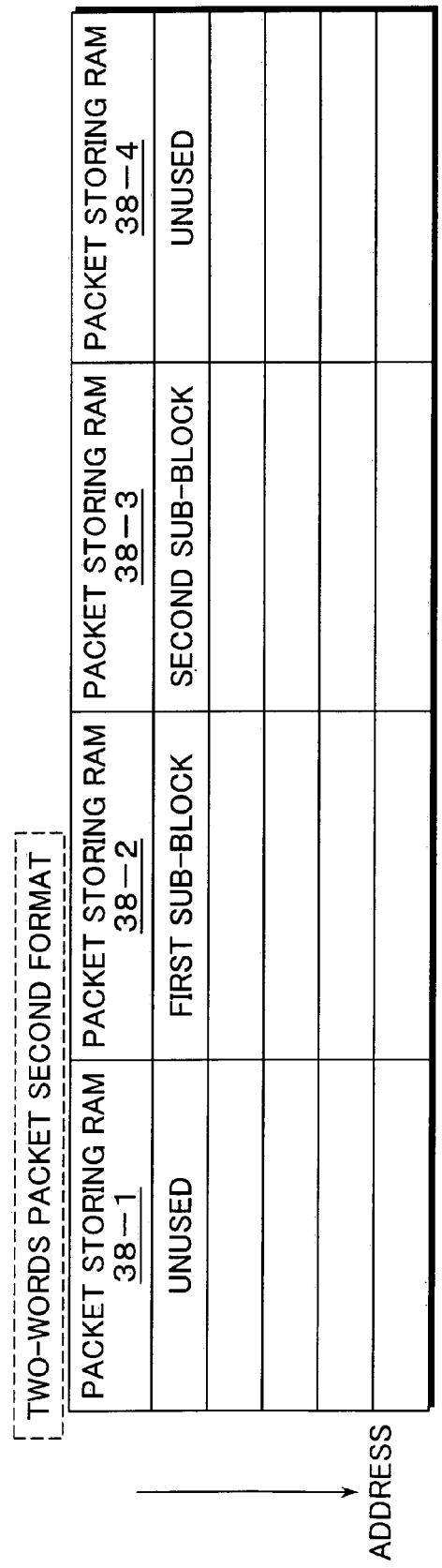

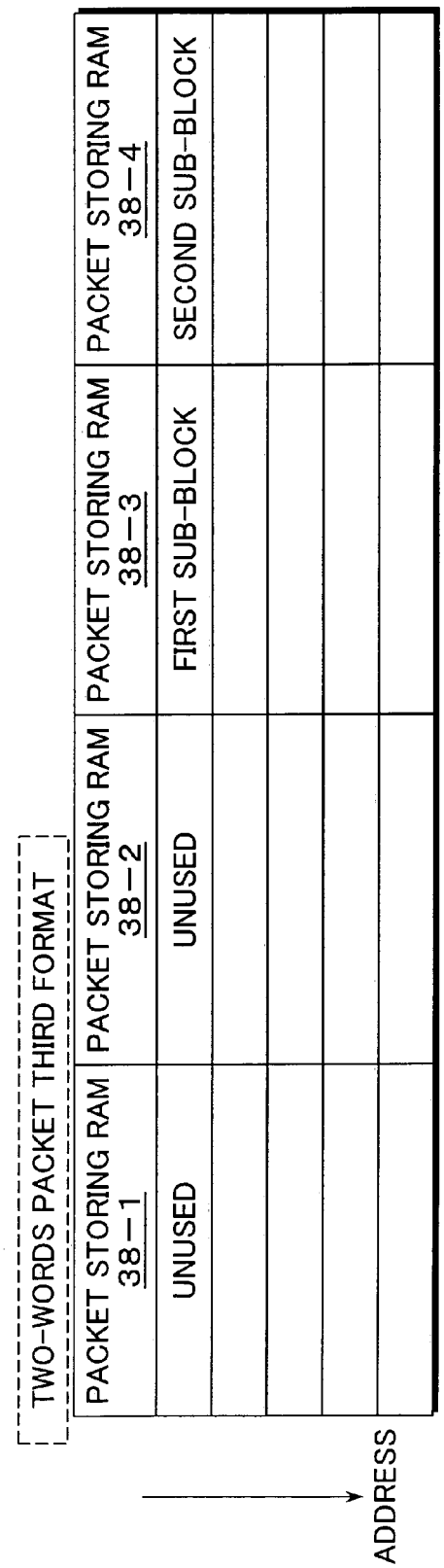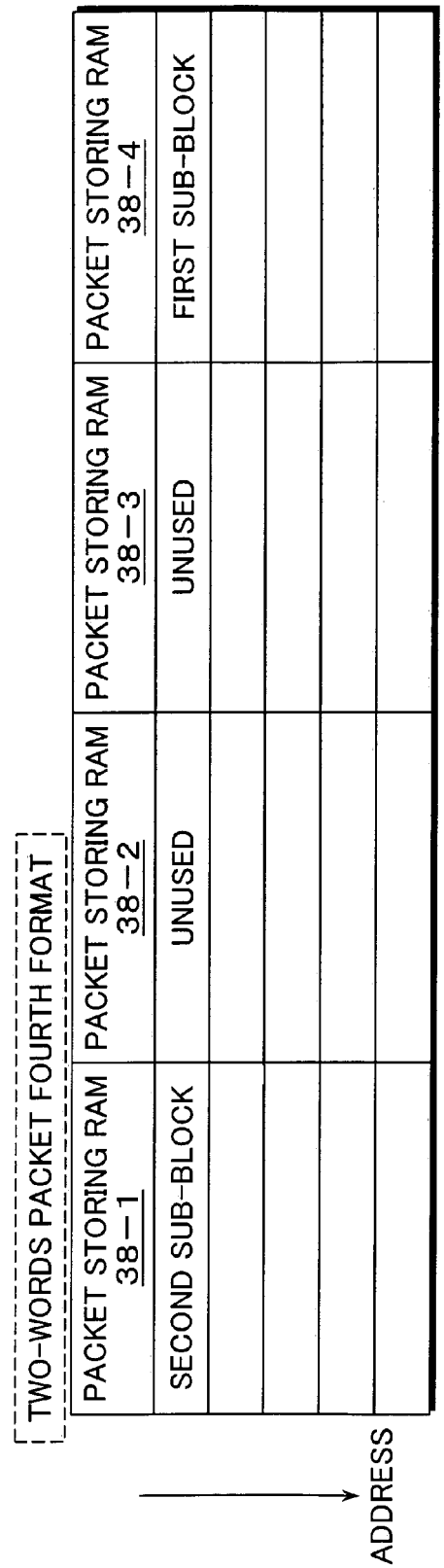

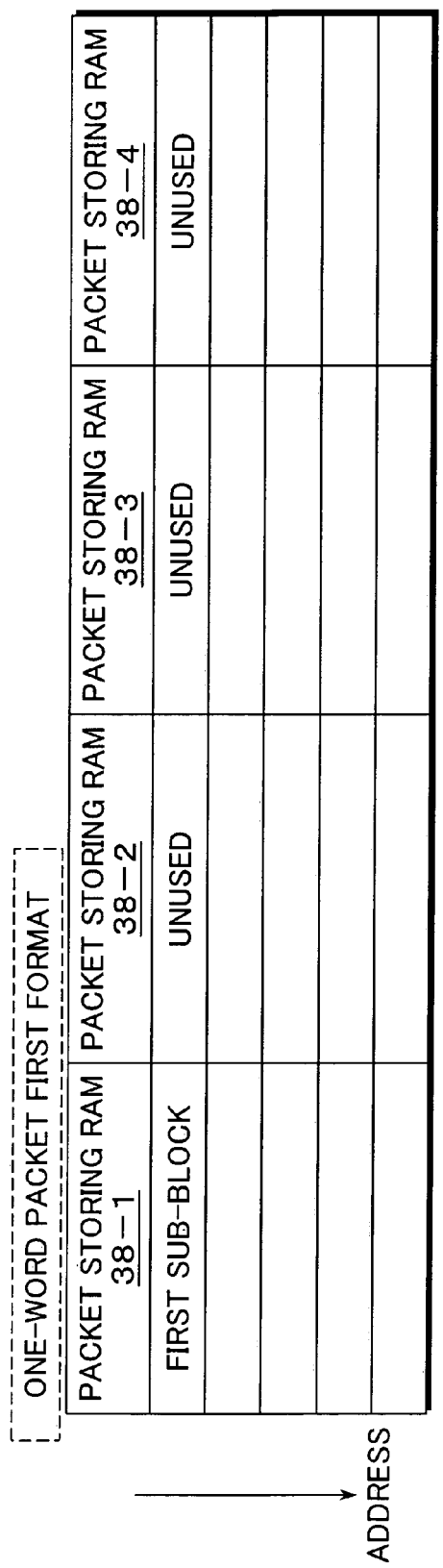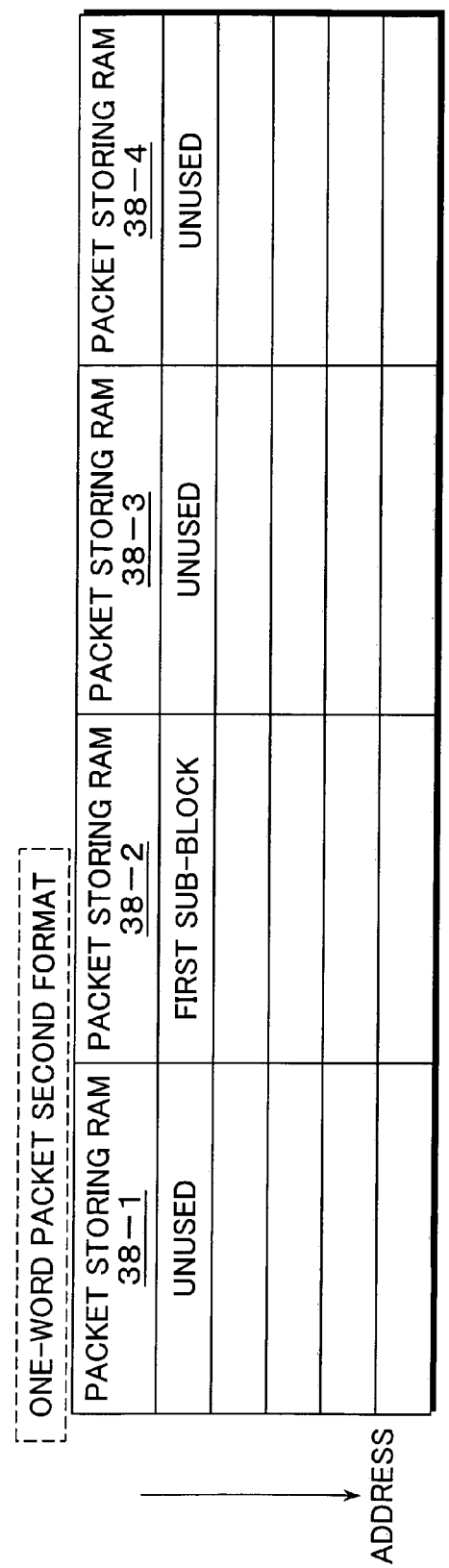

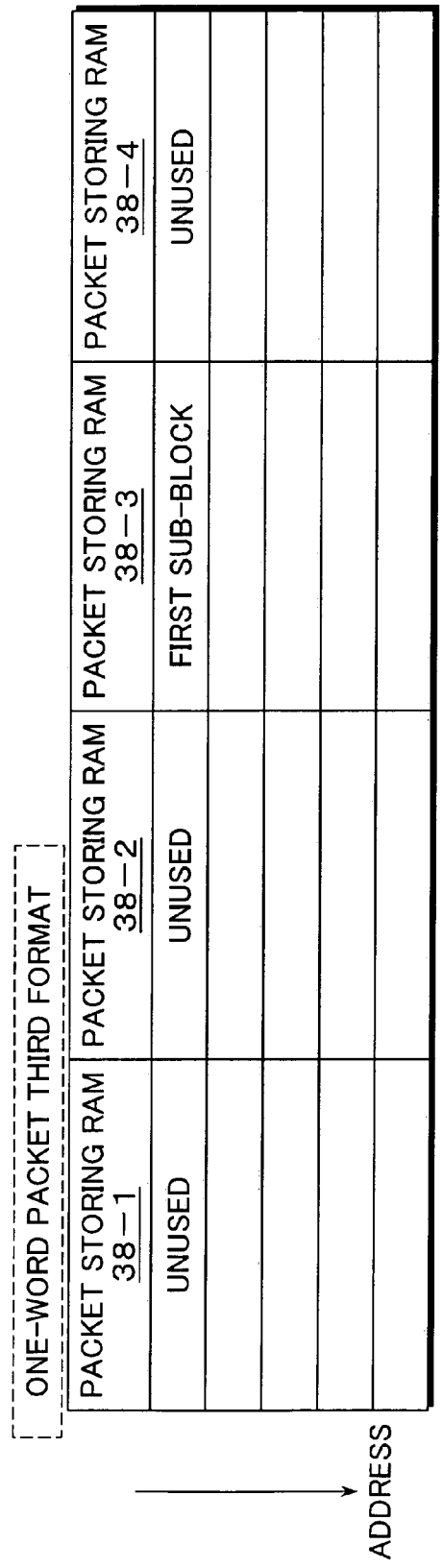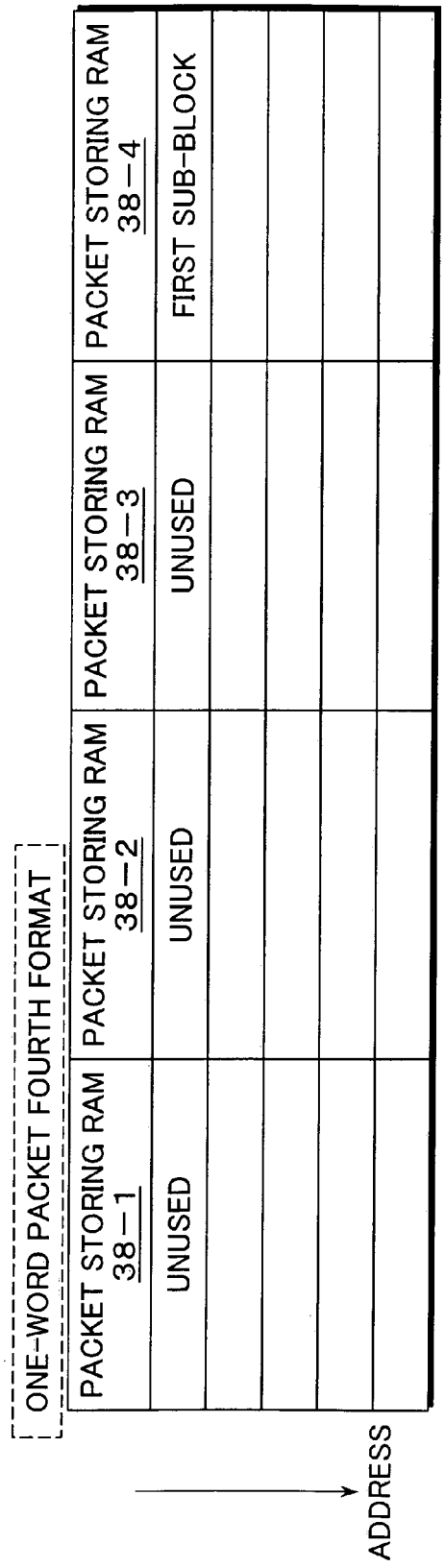

FIG. 11

| BUFFER RAM STORING STATE | BUFFER RAM 34-1 | BUFFER RAM 34-2 | BUFFER RAM 34-3 | BUFFER RAM 34-4 | FORMAT NUMBER | NUMBERS OF WORD OF APPLIED PACKET |
|---|---|---|---|---|---|---|
| FIRST CASE | 00 | 00 | 00 | 00 | FIRST FORMAT | ONE TO FOUR WORDS |
| SECOND CASE | 10 | 00 | 00 | 00 | SECOND FORMAT | ONE TO FOUR WORDS |
| THIRD CASE | 10 | 10 | 00 | 00 | THIRD FORMAT | ONE TO FOUR WORDS |
| FOURTH CASE | 10 | 10 | 10 | 00 | FOURTH FORMAT | ONE TO FOUR WORDS |
| FIFTH CASE | 10 | 10 | 10 | 10 | FIRST FORMAT | ONE AND TWO WORDS |
| SIXTH CASE | 11 | 10 | 10 | 10 | SECOND FORMAT | ONE AND TWO WORDS |
| SEVENTH CASE | 11 | 11 | 10 | 10 | THIRD FORMAT | ONE AND TWO WORDS |
| EIGHTH CASE | 11 | 11 | 11 | 10 | FOURTH FORMAT | ONE AND TWO WORDS |

| FORMAT NUMBER | BUFFER RAM 34-1 | BUFFER RAM 34-2 | BUFFER RAM 34-3 | BUFFER RAM 34-4 |
|---|---|---|---|---|
| FIRST FORMAT | 1 | 2 | 3 | 4 |
| SECOND FORMAT | 4 | 1 | 2 | 3 |
| THIRD FORMAT | 3 | 4 | 1 | 2 |
| FOURTH FORMAT | 2 | 3 | 4 | 1 |

FIG. 12B 50-3

| FORMAT NUMBER | BUFFER RAM 34-1 | BUFFER RAM 34-2 | BUFFER RAM 34-3 | BUFFER RAM 34-4 |
|---|---|---|---|---|
| FIRST FORMAT | 1 | 2 | 3 | 0 |
| SECOND FORMAT | 0 | 1 | 2 | 3 |
| THIRD FORMAT | 3 | 0 | 1 | 2 |
| FOURTH FORMAT | 2 | 3 | 0 | 1 |

FIG. 12C 50-2

| FORMAT NUMBER | BUFFER RAM 34-1 | BUFFER RAM 34-2 | BUFFER RAM 34-3 | BUFFER RAM 34-4 |
|---|---|---|---|---|
| FIRST FORMAT | 1 | 2 | 0 | 0 |
| SECOND FORMAT | 0 | 1 | 2 | 0 |
| THIRD FORMAT | 0 | 0 | 1 | 2 |
| FOURTH FORMAT | 2 | 0 | 0 | 1 |

FIG. 12D 50-1

| FORMAT NUMBER | BUFFER RAM 34-1 | BUFFER RAM 34-2 | BUFFER RAM 34-3 | BUFFER RAM 34-4 |
|---|---|---|---|---|
| FIRST FORMAT | 1 | 0 | 0 | 0 |
| SECOND FORMAT | 0 | 1 | 0 | 0 |
| THIRD FORMAT | 0 | 0 | 1 | 0 |
| FOURTH FORMAT | 0 | 0 | 0 | 1 |

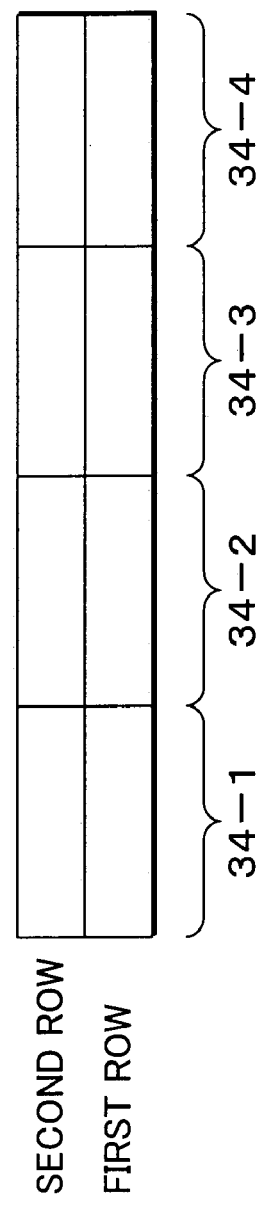
FIG. 13A THE RECEIVED FOUR-WORDS PACKET
FIG. 13B FIRST FORMAT
FIG. 13C FIRST CASE FOR A BUFFER RAM

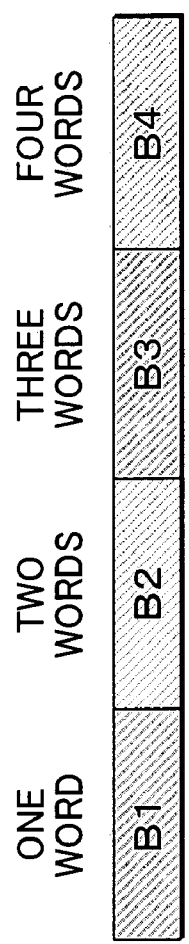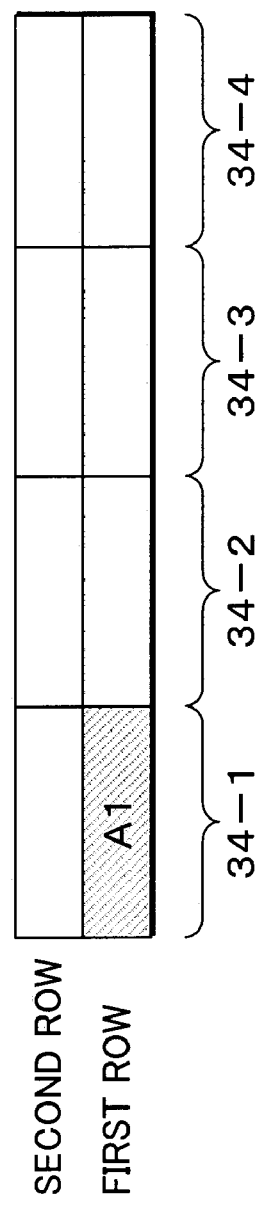
FIG. 14A THE RECEIVED FOUR-WORDS PACKET
FIG. 14B SECOND FORMAT
FIG. 14C SECOND CASE FOR A BUFFER RAM

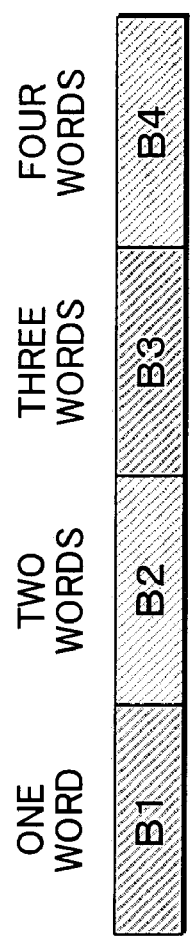
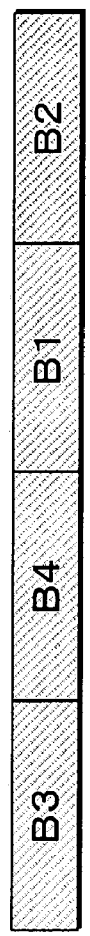
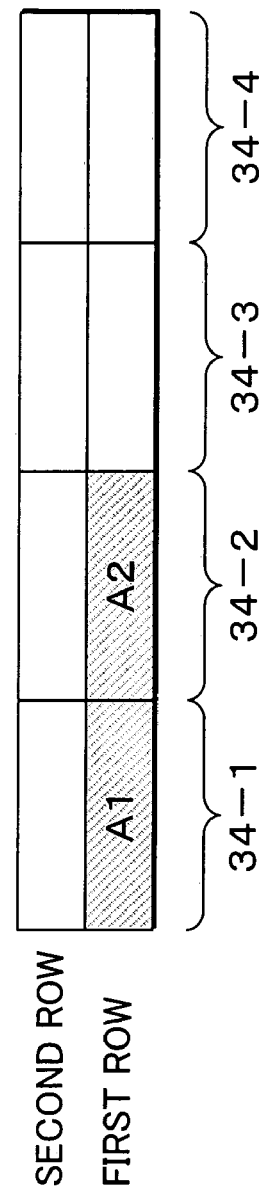
FIG. 15A THE RECEIVED FOUR-WORDS PACKET
FIG. 15B THIRD FORMAT
FIG. 15C THIRD CASE FOR A BUFFER RAM

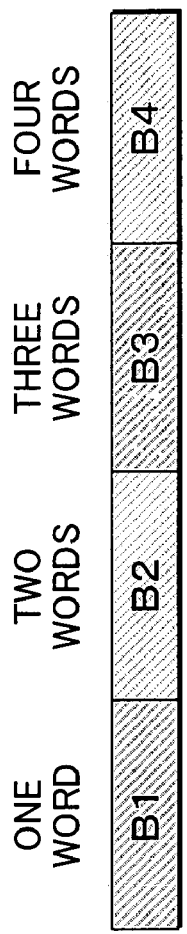
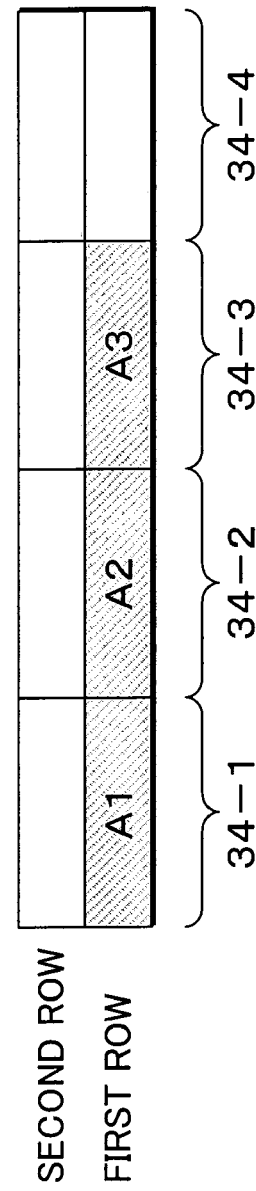
FIG. 16A THE RECEIVED FOUR-WORDS PACKET
FIG. 16B FOURTH FORMAT
FIG. 16C FOURTH CASE FOR A BUFFER RAM

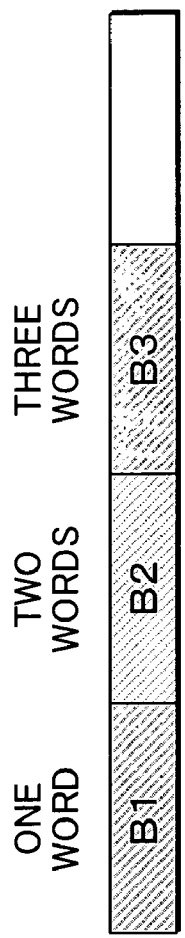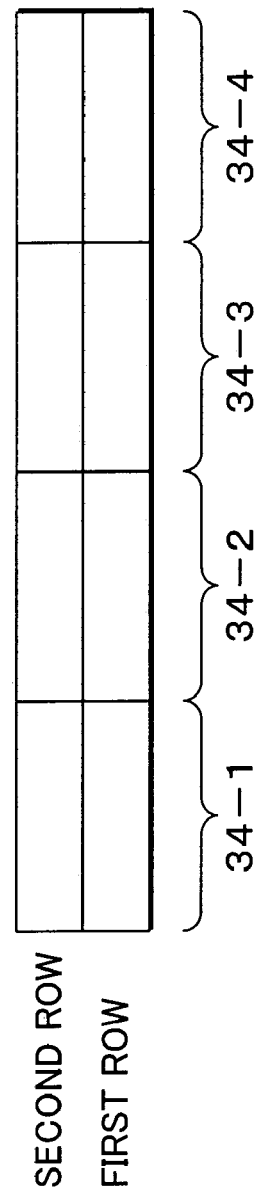
FIG. 17A
THE RECEIVED
THREE-WORDS PACKET
FIG. 17B
FIRST FORMAT
FIG. 17C
FIRST CASE
FOR A BUFFER RAM

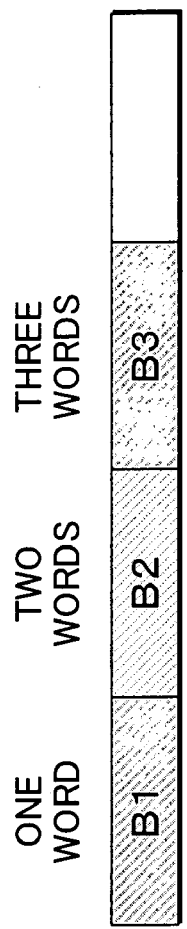
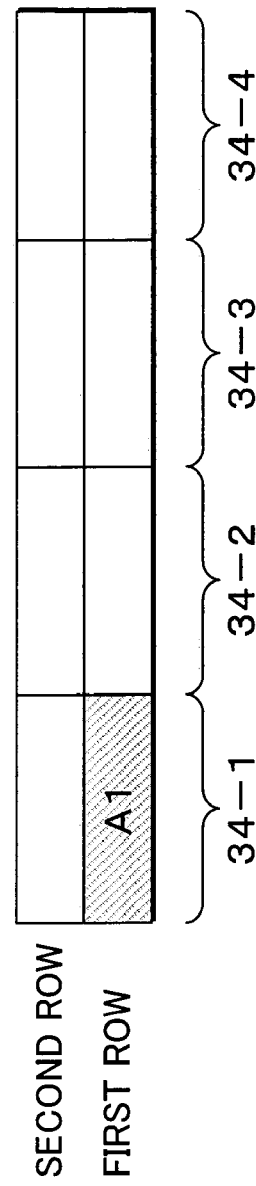
FIG. 18A THE RECEIVED THREE-WORDS PACKET
FIG. 18B SECOND FORMAT
FIG. 18C SECOND CASE FOR A BUFFER RAM

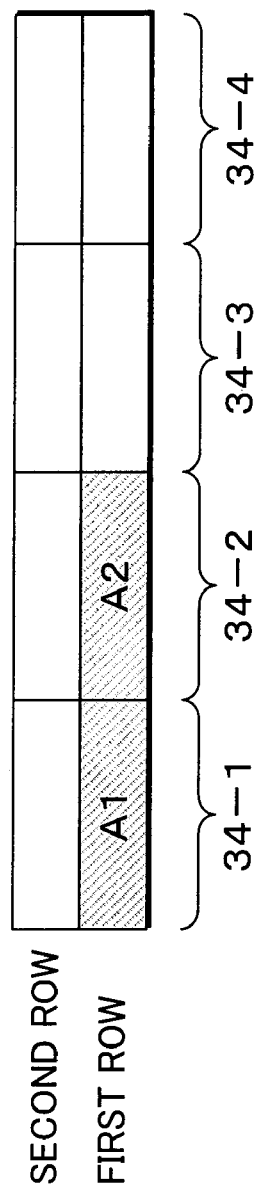
FIG. 19A THE RECEIVED THREE-WORDS PACKET
FIG. 19B THIRD FORMAT
FIG. 19C THIRD CASE FOR A BUFFER RAM

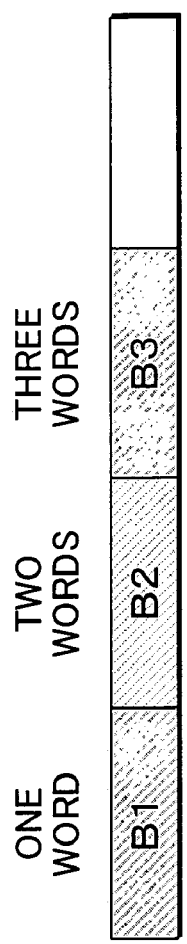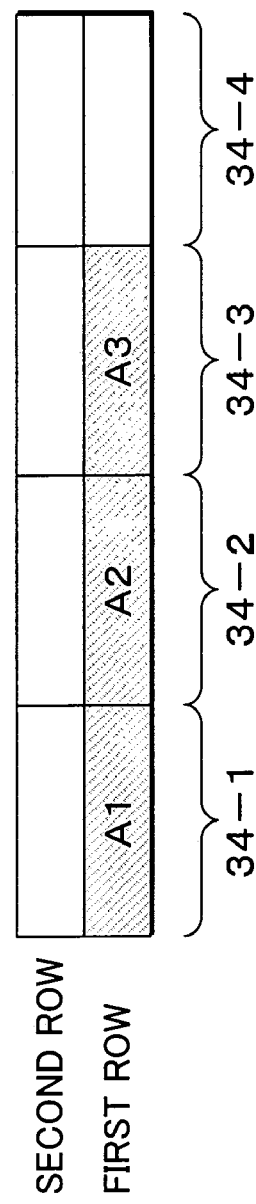
FIG. 20A
THE RECEIVED THREE-WORDS PACKET
FIG. 20B
FOURTH FORMAT
FIG. 20C
FOURTH CASE FOR A BUFFER RAM

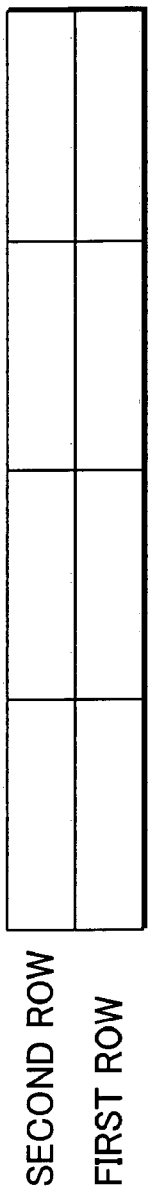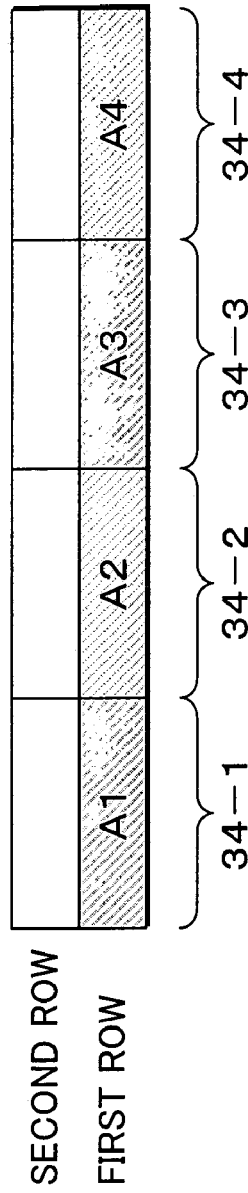
FIG. 21A THE RECEIVED TWO-WORDS PACKET
FIG. 21B FIRST FORMAT
FIG. 21C FIRST CASE FOR A BUFFER RAM
FIG. 21D FIFTH CASE FOR A BUFFER RAM

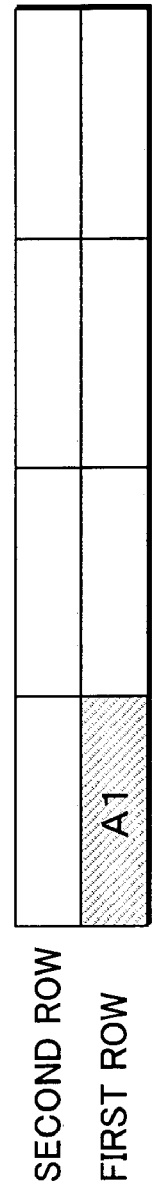
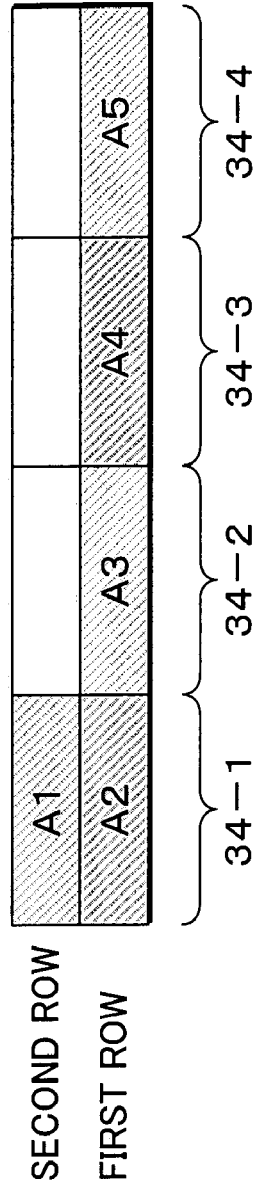
FIG. 22A THE RECEIVED TWO-WORDS PACKET
FIG. 22B SECOND FORMAT
FIG. 22C SECOND CASE FOR A BUFFER RAM
FIG. 22D SIXTH CASE FOR A BUFFER RAM

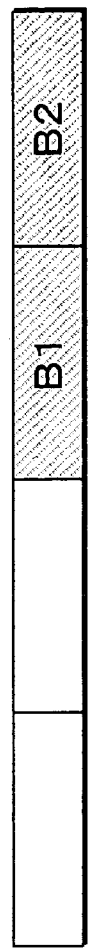
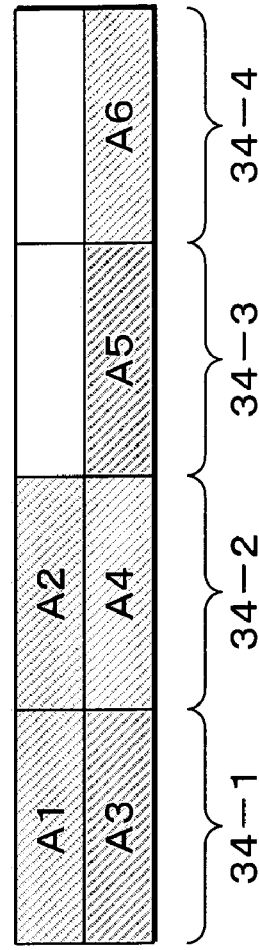
FIG. 23A THE RECEIVED TWO-WORDS PACKET
FIG. 23B THIRD FORMAT
FIG. 23C THIRD CASE FOR A BUFFER RAM
FIG. 23D SEVENTH CASE FOR A BUFFER RAM

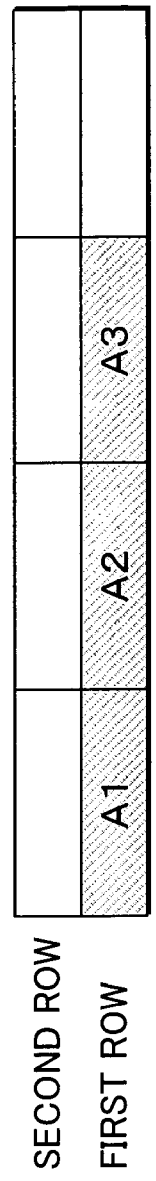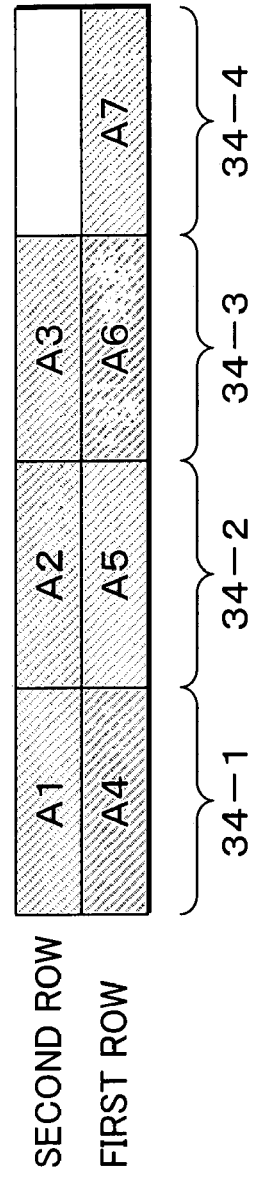
FIG. 24A THE RECEIVED TWO-WORDS PACKET
FIG. 24B FOURTH FORMAT
FIG. 24C FOURTH CASE FOR A BUFFER RAM
FIG. 24D EIGHTH CASE FOR A BUFFER RAM

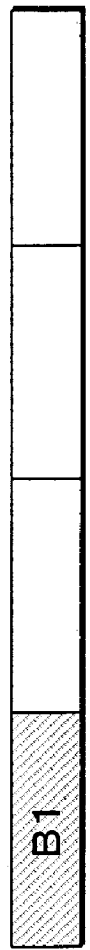
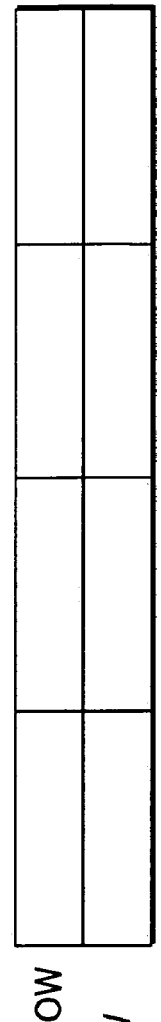
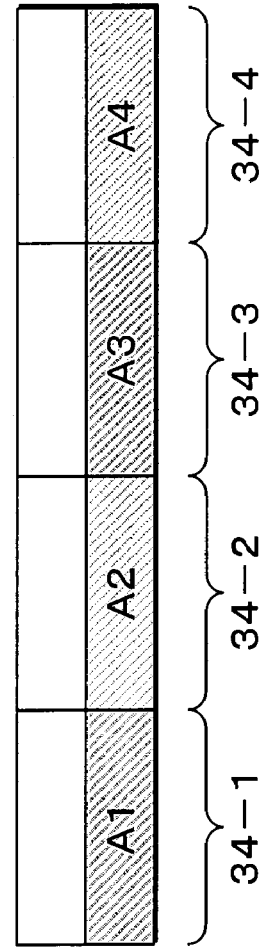
FIG. 25A THE RECEIVED ONE-WORD PACKET
FIG. 25B FIRST FORMAT
FIG. 25C FIRST CASE FOR A BUFFER RAM
FIG. 25D FIFTH CASE FOR A BUFFER RAM

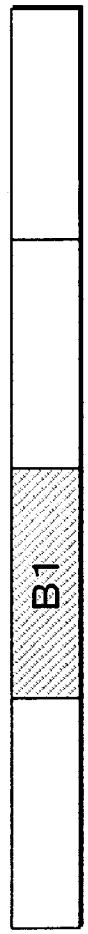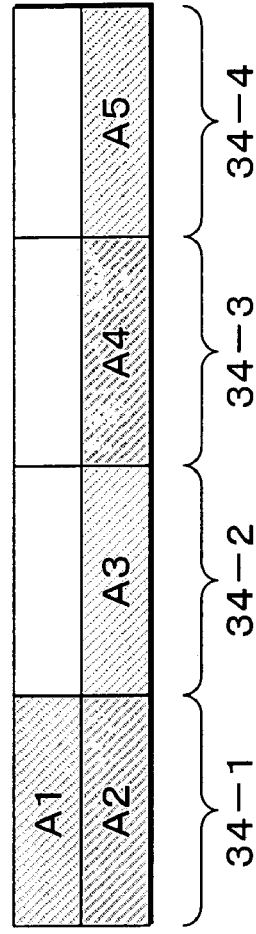
FIG. 26A
THE RECEIVED ONE-WORD PACKET
FIG. 26B
SECOND FORMAT
FIG. 26C
SECOND CASE FOR A BUFFER RAM
FIG. 26D
SIXTH CASE FOR A BUFFER RAM

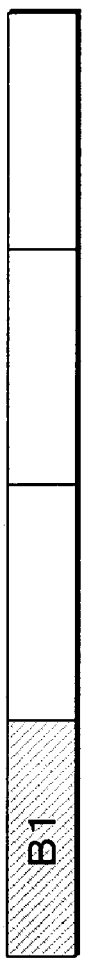
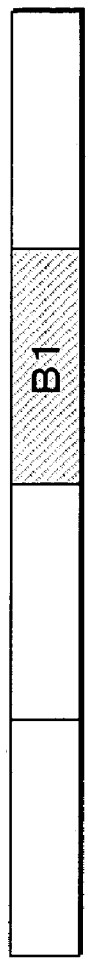
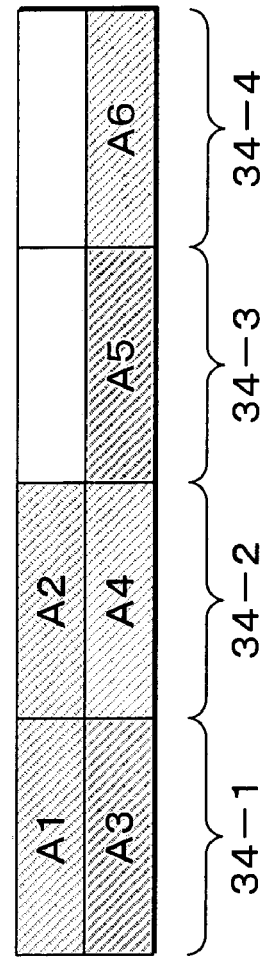
FIG. 27A THE RECEIVED ONE-WORD PACKET
FIG. 27B THIRD FORMAT
FIG. 27C THIRD CASE FOR A BUFFER RAM
FIG. 27D SEVENTH CASE FOR A BUFFER RAM

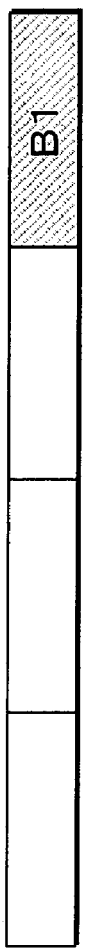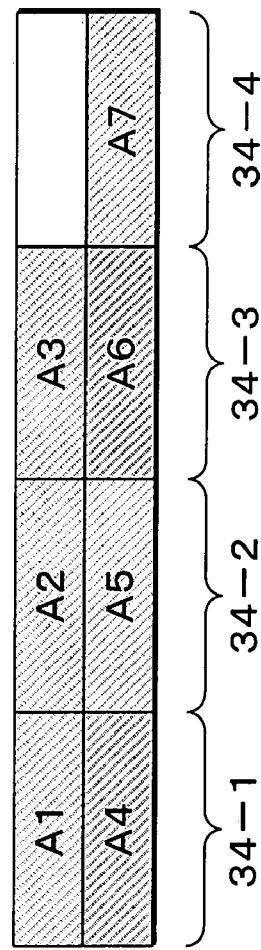
FIG. 28A THE RECEIVED ONE-WORD PACKET
FIG. 28B FOURTH FORMAT
FIG. 28C FOURTH CASE FOR A BUFFER RAM
FIG. 28D EIGHTH CASE FOR A BUFFER RAM

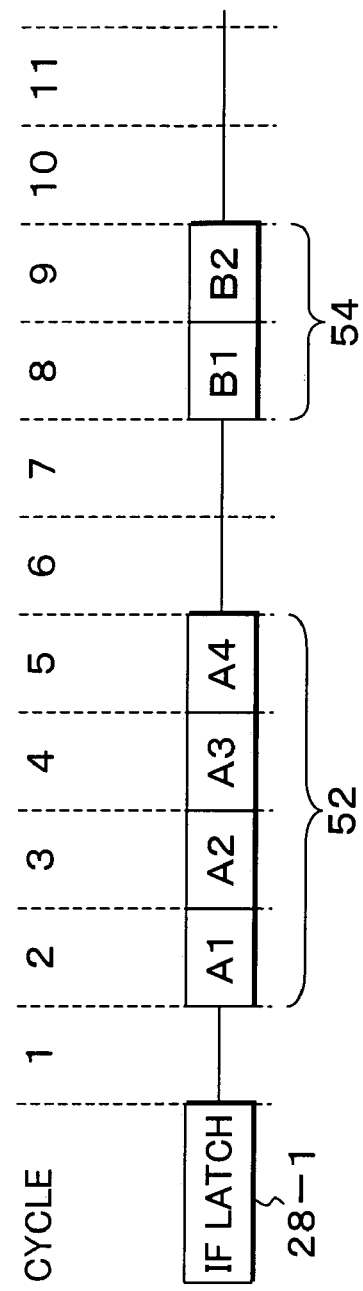
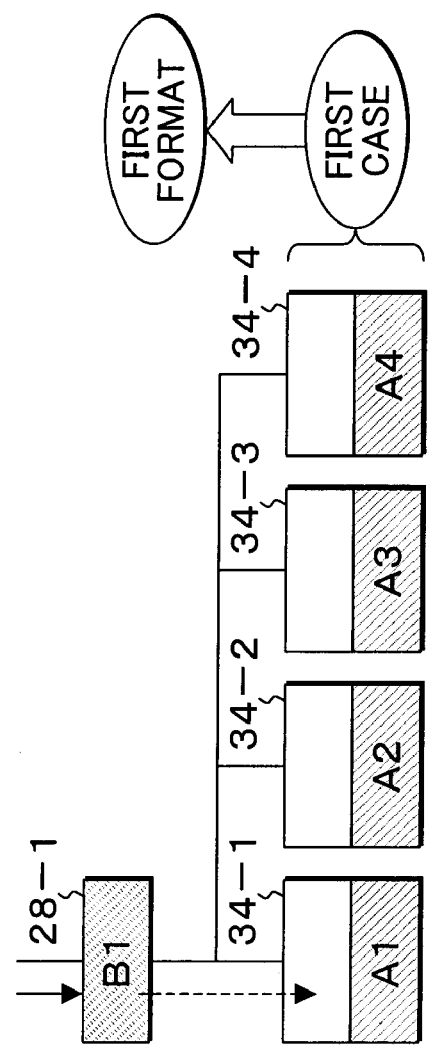
FIG. 29A
FIG. 29B
FIG. 29C

CIRCUIT, METHOD AND PROGRAM FOR DATA QUEUE CONTROL

CROSS-REFERENCE TO RELATED APPLICATION

This application claims the benefit of priority from prior application No. JP 2004-307978, filed Oct. 22, 2004, in Japan.

BACKGROUND OF THE INVENTION

1. Field of the Invention

The present invention relates generally to a circuit, method and program for data queue control that store packets from a plurality of interfaces into the same data queue consisting of a plurality of RAMs, and more particularly, to a circuit, method and program for data queue control that avoid concentration of writing of packets to a specific queue by arranging a buffer queue in front of the RAMs.

2. Description of the Related Art

Conventionally, in a processor board, etc. having a multi-CPU configuration, a system controller is arranged between a plurality of CPUs and resources such as memories and I/O buses, etc. After writing packets arrived from a plurality of interfaces positioned on the resource side into RAMs constituting a queue, the system controller reads those packets and provides data to the CPUs. However, when the throughput of arrival of the packets is lower than the throughput of writing of the RAMs, cases where the writing into the RAMs can not catch up are present. In such cases, a busy signal is issued to the interfaces and the transfer of the packets is discontinued and, therefore, the throughput of the writing into the RAMs is lowered. As a method of solving this problem, as shown in FIG. 1, the throughput of writing into the RAMs is secured by dispersing RAMs that are the target of writing of the packets into by preparing and deploying side by side a plurality of RAMs 200, 202, 204 and 206 and dividing an area for storing packets (one (1) block data area) into sub-blocks for each of the RAMs 200, 202, 204 and 206. FIG. 2 shows a data queue control circuit using the RAMs of FIG. 1 and shows the case where packet storage RAM areas 214-1 to 214-4 obtained by dividing into four (4) sub-blocks are arranged side by side for packets received by six (6) IF latches 208-1 to 208-6. Outputs of the IF latches 208-1 to 208-6 that receive the packets are connected with packet control circuits 210-1 to 210-6 and outputs of the packet control circuits 210-1 to 210-6 are connected with the packet storage RAM areas 214-1 to 214-4 through intervening circuits 212-1 to 212-4. A packet reading circuit 216 is provided to the output side of the packet storage RAM areas 214-1 to 214-4.

However, though such a data queue control method of FIG. 2 has no problem in the case where all of packet data of the amount of one (1) block is stored when packets are stored, that is, the case where all of the packet storage RAM areas 214-1 to 214-4 corresponding to the RAMs 200, 202, 204 and 206 deployed side by side are utilized, a problem arises that the packet storage RAM areas 214-1 to 214-4 deployed side by side can not be effectively utilized and the targets of the writing of the packets concentrate on a specific packet storage RAM area, therefore, the throughput of writing the packets into the RAMs can not be secured in the case where the length of the packets are various, packets having the length shorter than one (1) block are mixed and short packets arrive concentrating because data writing areas of the packets are limited. A data queue control method shown in FIG. 3, for example, is considered in order to solve this problem. In the data queue control circuit of FIG. 3, in addition to the original packet storage Ram areas 214-1 to 214-4, buffer RAMs 218-1 to 218-6 constituting buffer queues for retaining temporarily the packets for the IF latches 208-1 to 208-6 are arranged, and buffer control circuits 220-1 to 220-6 and RAM reading latches 222-1 to 222-6 are provided to the buffer RAMs 218-1 to 218-6. For such a data queue control circuit of FIG. 3, it can be considered to execute control that executes resource management that controls packet transfer using the busy signal, etc. issued from the buffer control circuits 220-1 to 220-6 such that the buffer RAMs 218-1 to 218-6 are not overflowed, reads the packets from the buffer RAMs 218-1 to 218-6 while causing the transmission origin to discontinue the transfer of the packets when necessary, and writes into the packet storage RAM areas 214-1 to 214-4. However, though the data queue control method of FIG. 3 can solve the problem that the writing of packets into the packet storage RAM areas 214-1 to 214-4 can not catch up, the buffer RAMs 218-1 to 218-6, the buffer control circuits 220-1 to 220-6 and the RAM reading latches 222-1 to 222-6 must be provided respectively as many as the number of the interfaces. Therefore the a problem that the circuit scale is considerably increased arises. Furthermore, a problem that degradation of performance is caused to arise because the number of cycles from reception of the packets by the IF latches 208-1 to 208-6 to the writing of the packets into the packet storage RAM areas 214-1 to 214-4 is increased.

SUMMARY OF THE INVENTION

According to the present invention there are provided a circuit, method and program for data queue control that execute control by providing a buffer queue such that the increase of the circuit scale and the number of process cycles are minimized to a necessary extent. The present invention provides a data queue control circuit. The data queue control circuit of the present invention comprises:

a plurality of IF latches (receiving latches) 28 configured to receive packets having various numbers of words from a plurality of interfaces;

buffer queues 34 of the number equal to the largest number of words, the buffer queues 34 storing separately on a word by word basis the packets received by the IF latches 28;

packet storage queues 38 of the number equal to the number of the buffer queues 34, the packet storage queues 38 storing the packets read from the buffer queues 34;

a format determining circuit 32 configured to define in advance a plurality of types of writing formats corresponding to availabilities of the buffer queues 34, the format determining circuit 32, when a packet is received by one of the plurality of receiving latches, determining dynamically a writing format corresponding to the current availability of the buffer queues 34;

a packet control circuit 30 configured to store separately on a word by word basis the received packets into the buffer queues, in conformity with the writing format determined by the format determining circuit 32;

a format information storage unit 40 configured to store formats determined by the format determining circuit 32; and, a packet reading circuit 42 configured to recognize the positions to store effective data based on the formats stored in the format information storage unit 40, to read the packets from the packet storage queues 38.

In this case, the received packet is block data of a predetermined size, with one (1) word being a sub-block obtained by dividing the block data into pieces of another predetermined size. The format determining circuit defines a writing format that causes the received packets to be stored in order of word into the plurality of buffer queues in order of descending availability of the buffer queues. The format determining circuit defines a writing format that causes the words to be stored in order of word into the plurality of buffer queues in order of descending availability of the buffer queues when the received packet has full words. The format determining circuit defines a writing format that causes the effective words to be stored in order of word into the plurality of buffer queues in order of descending availability of the buffer queues when the received packet has vacant words. The format determining circuit, when the received packet has n words, defines a writing format that causes the n words to be stored in order of word into n buffer queues in order of descending availability of the buffer queues, and, when the received packet has words fewer than n words, defines a writing format that causes each effective word fewer than n words to be stored in order of word into n buffer queues in order of descending availability of the buffer queues. The format determining circuit, when the received packet has four (4) words, defines a writing format that causes the four (4) words to be stored in order of word into four (4) buffer queues in order of descending availability of the buffer queues, and, when the received packet has three (3) words, two (2) words or one (1) word, defines a writing format that causes each effective word of the three (3) words, two (2) words or one (1) word to be stored in order of word into four (4) buffer queues in order of descending availability of the buffer queues. The plurality of buffer queues consist of RAMs each having at least two (2) addresses with a size of one (1) word, and the format determining circuit defines a writing format corresponding to the availability of the RAM configuration of the plurality of buffer queues and determines a writing format corresponding to the availability of the RAM configuration of the plurality of buffer queues at the time when the packets are received. Each of the buffer queues disposed corresponding to each word of the received packets comprises a buffer queue group in a parallel arrangement of corresponding number of buffer queues to the number of interfaces for the receiving latches, and reads each word of the received packets for each receiving latch stored in each buffer queue group, for each of the received packets using a plurality of intervening circuits disposed corresponding to respective buffer queue groups, to store respective read words into the packet storage queues. The receiving latch receives the packets from the interfaces of resources such as a memory controller and an input/output controller, and the packet reading circuit outputs the packets read from the packet storage queues to a process module such as a CPU.

The present invention provides a data queue control method. The data queue control method of the present invention comprises:

a packet reception step of receiving by a plurality of IF latches (receiving latches) packets having various numbers of words from a plurality of interfaces;

a buffer queue storage step of separating on a word by word basis the packets received by the receiving latches and storing the separated packets into buffer queues of the number equal to the largest number of words, a packet storage step of storing the packets read from the buffer queues into packet storage queues of the number equal to the number of the buffer queues;

a format determination step of defining in advance a plurality of types of writing formats corresponding to availabilities of the buffer queues, and, when a packet is received by one of the plurality of receiving latches, determining dynamically a writing format corresponding to the current availability of the buffer queues;

a packet control step of storing separately on a word by word basis the received packets into the buffer queues, in conformity with the writing format determined by the format determination step;

a format information storage step of storing formats determined by the format determination step; and a packet reading step of recognizing the positions to store effective data based on the formats stored by the format information storage step, and reading the packets from the packet storage queues.

The present invention provides a data queue control program executed by a computer making up a system controller. The data queue control program of the present invention is operable to drive the computer to execute:

a packet reception step of receiving by a plurality of receiving latches packets having various numbers of words from a plurality of interfaces;

a buffer queue storage step of separating on a word by word basis the packets received by the receiving latches and storing the separated packets into buffer queues of the number equal to the largest number of words, a packet storage step of storing the packets read from the buffer queues into packet storage queues of the number equal to the number of the buffer queues;

a format determination step of defining in advance a plurality of types of writing formats corresponding to availabilities of the buffer queues, and, when a packet is received by one of the plurality of receiving latches, determining dynamically a writing format corresponding to the current availability of the buffer queues;

a packet control step of storing separately on a word by word basis the received packets into the buffer queues, in conformity with the writing format determined by the format determination step;

a format information storage step of storing formats determined by the format determination step; and a packet reading step of recognizing the positions to store effective data based on the formats stored by the format information storage step, and reading the packets from the packet storage queues.

The details of the method and program for data queue control according to the present invention are basically the same as those of the data queue control circuit of the present invention.

According to the present invention, in the case where packets having various lengths due to variation of the number of words included arrive at different timings from a plurality of interfaces, in order to write into the original packet storage queues after determining dynamically a writing format based on the availability of a buffer queue, dividing the packets into individual words and storing the divided words into the buffer queues, writing divided for individual words is executed to the buffer queue such that concentration of writing on a specific packet storage queue is avoided. As a result, load of writing on the original packet storage queues can be made uniform and, thereby, the circuit scale of the buffer queues necessary for securing the throughput can be minimized and reduction of mounting footprint and costs can be facilitated. The above and other objects, features and advantages of the present invention will become more apparent from the following detailed description with reference to the drawings.

BRIEF DESCRIPTION OF THE DRAWINGS

FIGS. 3A-3B are explanatory views of the conventional data queue control process to which buffer RAMS are arranged;

FIGS. 7A to 7D are explanatory views of writing states of packet storage RAMs according to a first to a fourth format of a four (4)-word packet;

FIGS. 8A to 8D are explanatory views of writing states of the packet storage RAMs according to a first to a fourth format of a three (3)-word packet;

FIGS. 9A to 9D are explanatory views of writing states of the packet storage RAMs according to a first to a fourth format of a two (2)-word packet;

FIGS. 10A to 10D are explanatory views of writing states of the packet storage RAMs according to a first to a fourth format of a one (1)-word packet;

FIG. 11 is an explanatory view of a format determination table used by a format determining circuit of FIG. 4;

FIGS. 12A to 12D are explanatory views of a four (4)-word, a three (3)-word, a two (2)-word and a one (1)-word format tables used by the format determining circuit of FIG. 4;

FIGS. 13A to 13C are explanatory views of writing according to a first format determined according to a state of a first case of the buffer RAMs when a four (4)-word packet has been received;

FIGS. 14A to 14C are explanatory views of writing according to a second format determined according to a state of a second case of the buffer RAMs when the four (4)-word packet has been received;

FIGS. 15A to 15C are explanatory views of writing according to a third format determined according to a state of a third case of the buffer RAMs when the four (4)-word packet has been received;

FIGS. 16A to 16C are explanatory views of writing according to a fourth format determined according to a state of a fourth case of the buffer RAMs when the four (4)-word packet has been received;

FIGS. 17A to 17C are explanatory views of writing according to a first format determined according to a state of a first case of the buffer RAMs when a three (3)-word packet has been received;

FIGS. 18A to 18C are explanatory views of writing according to a second format determined according to a state of a second case of the buffer RAMs when the three (3)-word packet has been received;

FIGS. 19A to 19C are explanatory views of writing according to a third format determined according to a state of a third case of the buffer RAMs when the three (3)-word packet has been received;

FIGS. 20A to 20C are explanatory views of writing according to a fourth format determined according to a state of a fourth case of the buffer RAMs when the three (3)-word packet has been received;

FIGS. 21A to 21D are explanatory views of writing according to a first format determined according to a state of the first case or a fifth case of the buffer RAMs when a two (2)-word packet has been received;

FIGS. 22A to 22D are explanatory views of writing according to a second format determined according to a state of the second case or a sixth case of the buffer RAMs when the two (2)-word packet has been received;

FIGS. 23A to 23D are explanatory views of writing according to a third format determined according to a state of the third case or a seventh case of the buffer RAMs when the two (2)-word packet has been received;

FIGS. 24A to 24D are explanatory views of writing according to a fourth format determined according to a state of the fourth case or an eighth case of the buffer RAMs when the two (2)-word packet has been received;

FIGS. 25A to 25D are explanatory views of writing according to a first format determined according to a state of the first case and a fifth case of the buffer RAMs when a one (1)-word packet has been received;

FIGS. 26A to 26D are explanatory views of writing according to a second format determined according to a state of the second case or a sixth case of the buffer RAMs when the four (4)-word packet has been received;

FIGS. 27A to 27D are explanatory views of writing according to a third format determined according to a state of the third case and a seventh case of the buffer RAMs when the one (1)-word packet has been received;

FIGS. 28A to 28D are explanatory views of writing according to a fourth format determined according to a state of the fourth case or an eighth case of the buffer RAMs when the one (1)-word packet has been received;

FIGS. 29A to 29E are explanatory views of writing into the buffer RAMs in a state of the first case when a two (2)-word packet is received following a four (4)-word packet, and a writing operation into the packet RAMs after that;

FIGS. 30A to 30C are explanatory views of writing into the buffer RAMs in a state of the second case when the two (2)-word packet is received following the four (4)-word packet, and a writing operation into the packet RAMs after that.

DETAILED DESCRIPTION OF THE PREFERRED EMBODIMENT

Figure 1:
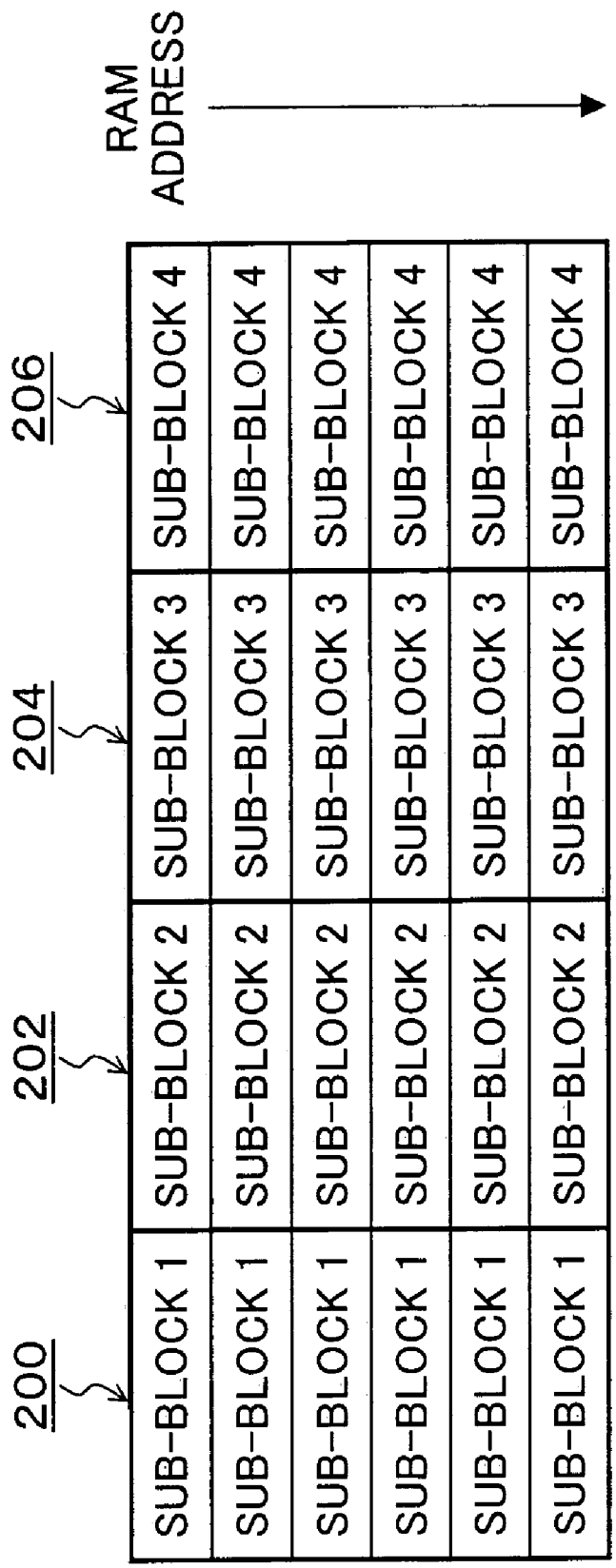
FIG. 1 is an explanatory view of a conventional apparatus that divides received packets into sub-blocks and stores the sub-blocks into packet storage RAMs.
Figure 2:
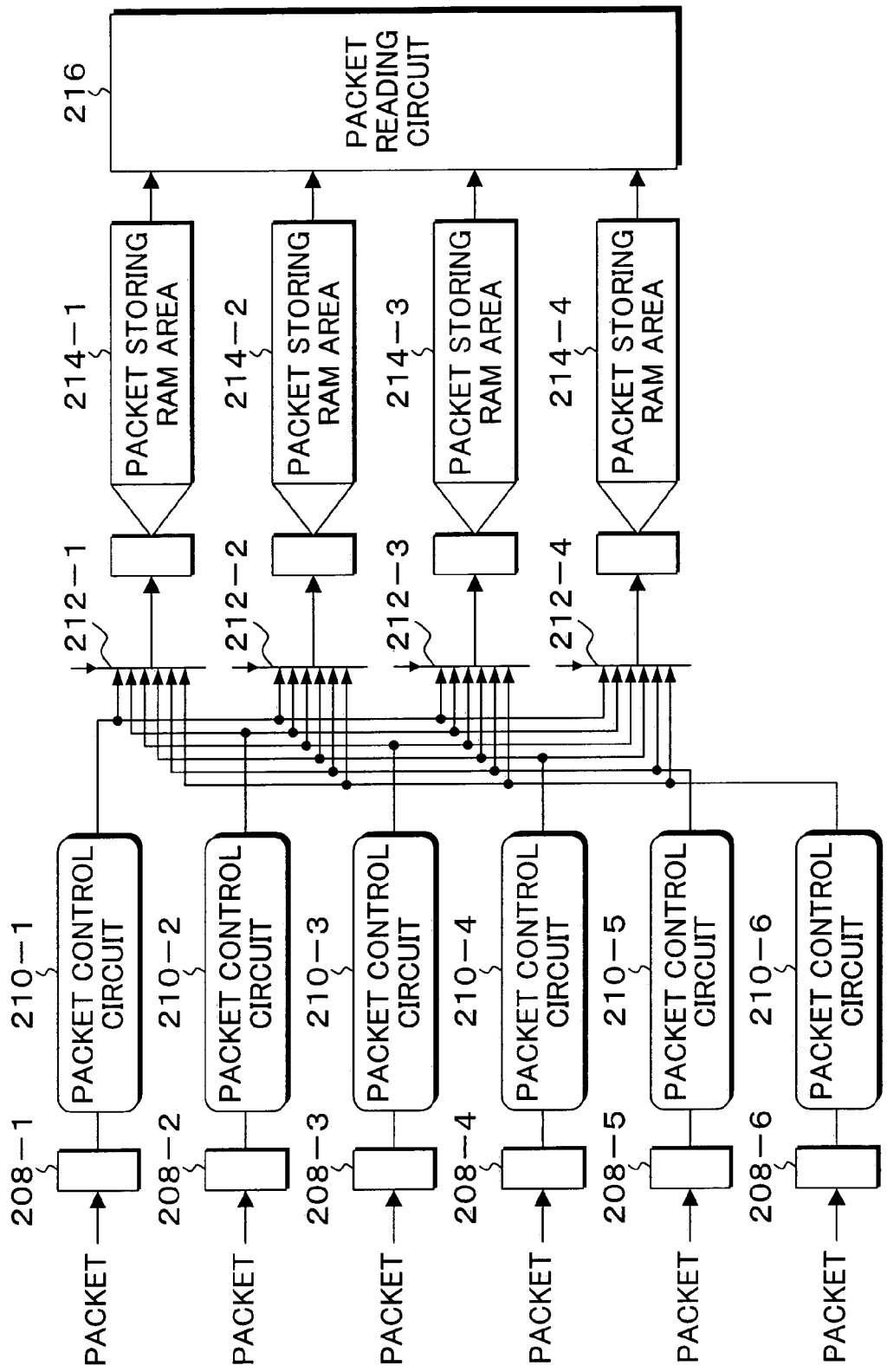
FIG. 2 is an explanatory view of a conventional data queue control circuit.
Figure 3A:
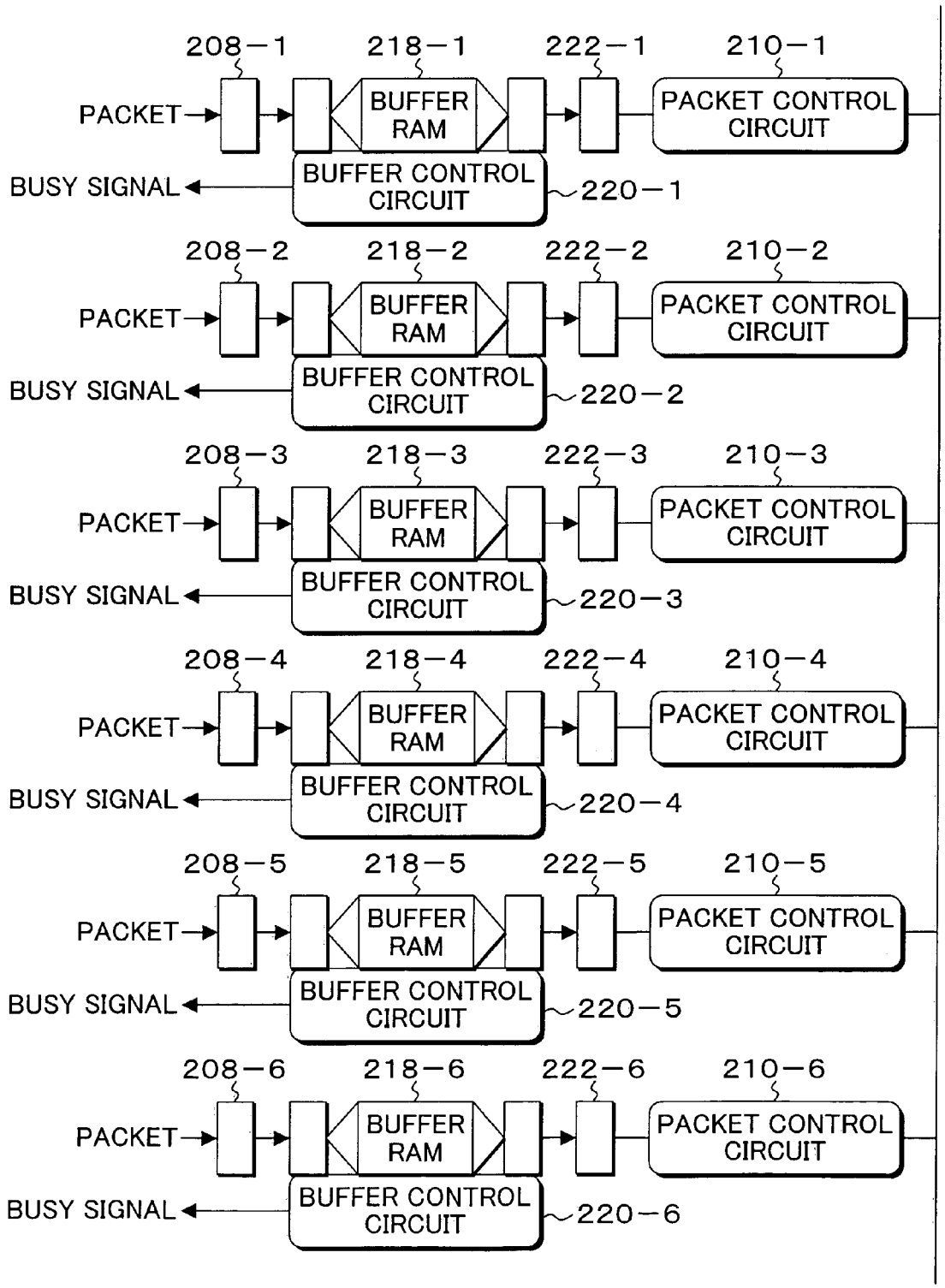
Figure 4:
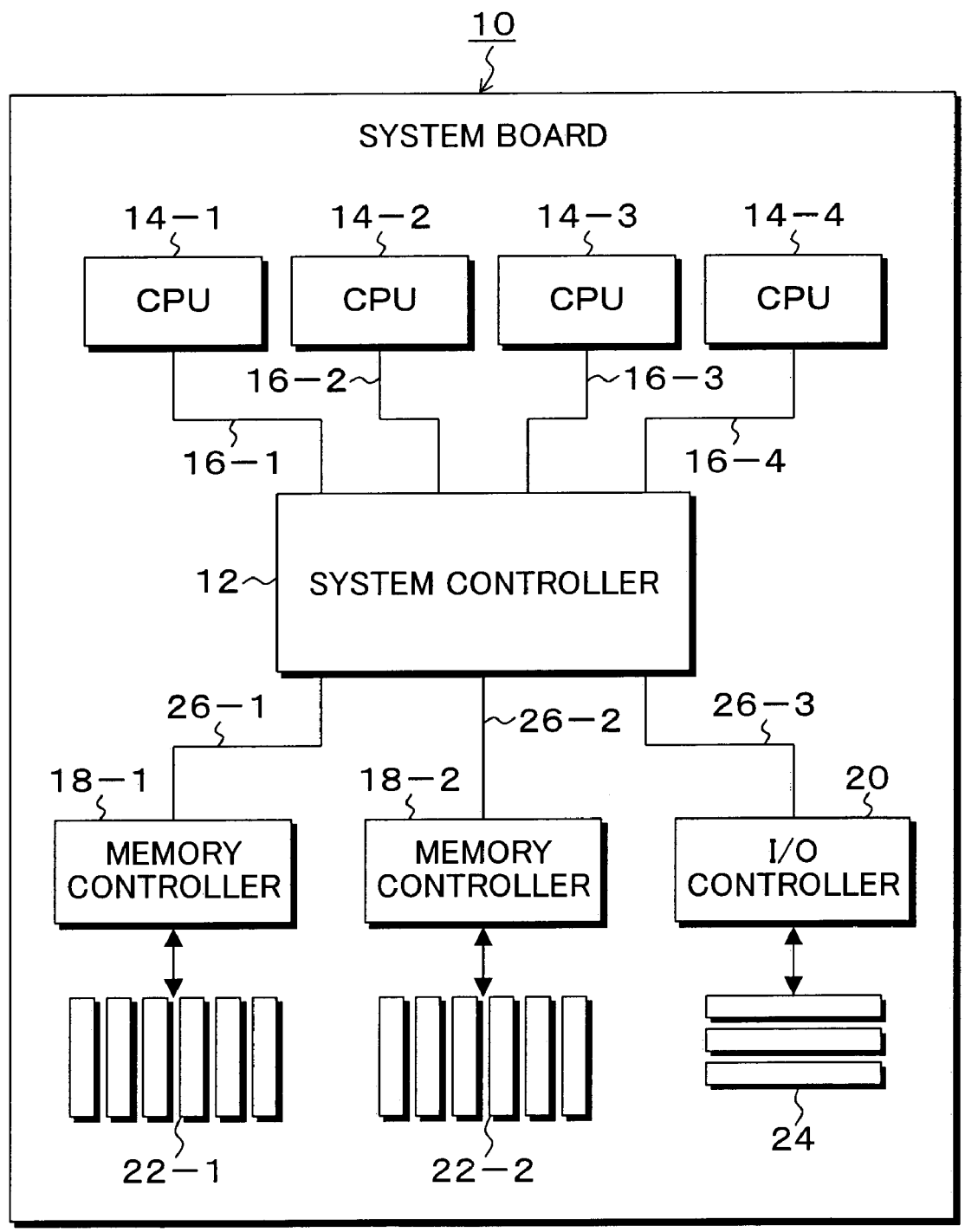
FIG. 4 is a block diagram of a system board to which the present invention is applied.

FIG. 4 is a block diagram of a system board in a computer system to which the present invention is applied. In FIG. 4, a system board 10 is provided with a system controller 12 and a data queue control circuit of the present invention is incorporated in the system controller 12. The system controller 12 is connected with CPUs 14-1 to 14-4 through packet buses 16-1 to 16-4. In addition, the system controller 12 is connected with memory controllers 18-1 and 18-2 and an I/O controller 20 through packet buses 26-1 to 26-3. The memory controllers 18-1 and 18-2 are connected with dual-in-line memory modules (DIMM) 22-1 and 22-2. The I/O controller 20 is connected with an I/O bus 24 and is connected with various input/output devices not shown including a magnetic disk sub-system, through the I/O bus 24. The system controller 12 receives packets transferred by each interface (packet buses 16-1 to 16-4, 26-1 to 26-3) connected respectively with the memory controllers 18-1 and 18-2, the I/O controller 20 and the CPUs 14-1 to 14-4, stores the received packets into queues of the data queue control circuit incorporated therein, thereafter, reads and transfers the packets to the side of the CPUs 14-1 to 14-4 and necessary processes corresponding to the content of the packets are executed by the CPUs 14-1 to 14-4. Data processed by the CPUs 14-1 to 14-4 are sent to the system controller 12 by the interfaces as packets and the packets are stored in the queues. Thereafter, the packets are transferred to the side of corresponding controllers or CPUs.

Figure 5A:
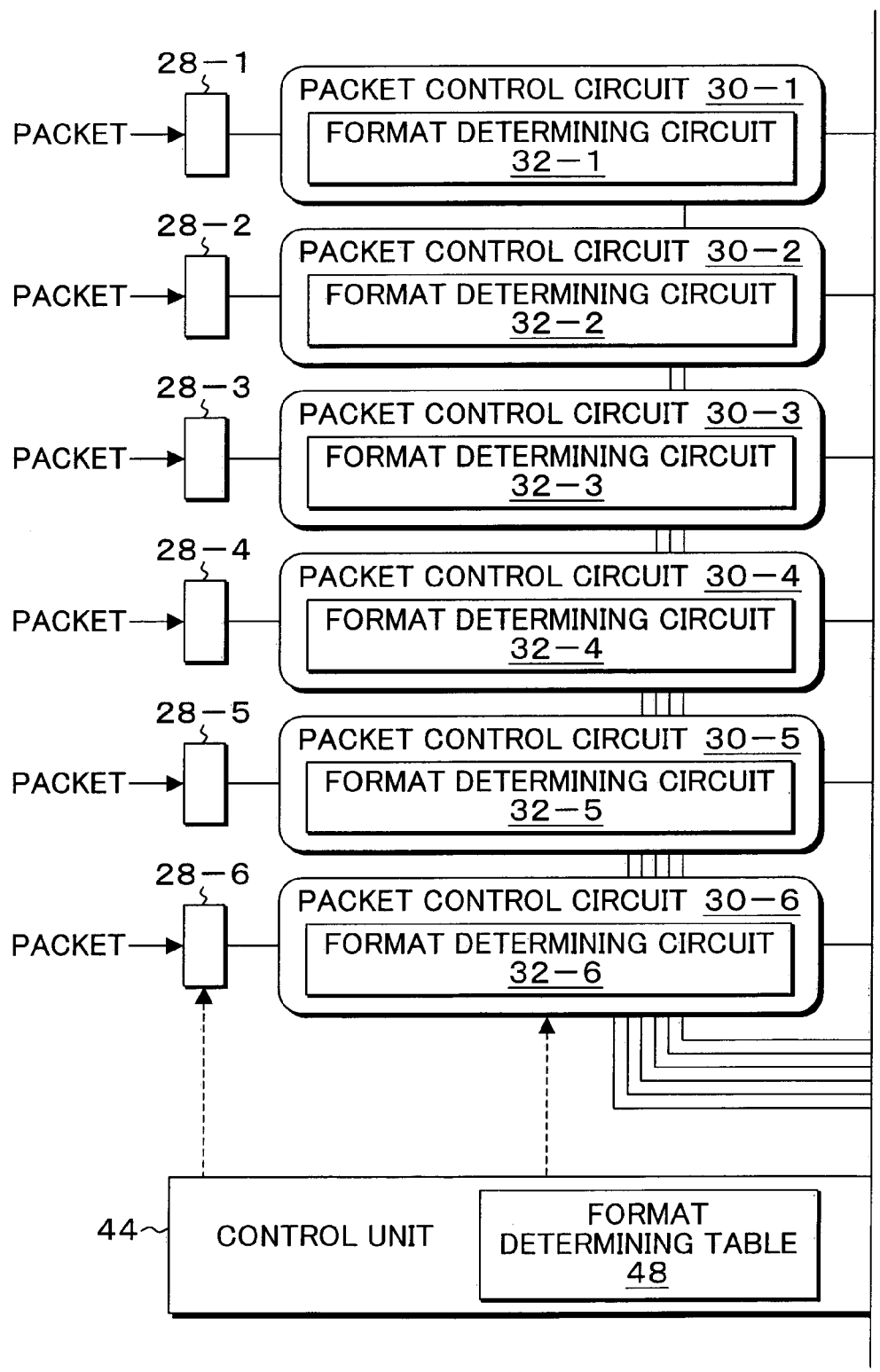
FIGS. 5A to 5B re block diagrams of an embodiment of a data queue control circuit of the present invention provided to a system controller of FIG. 4.
Figure 5B:
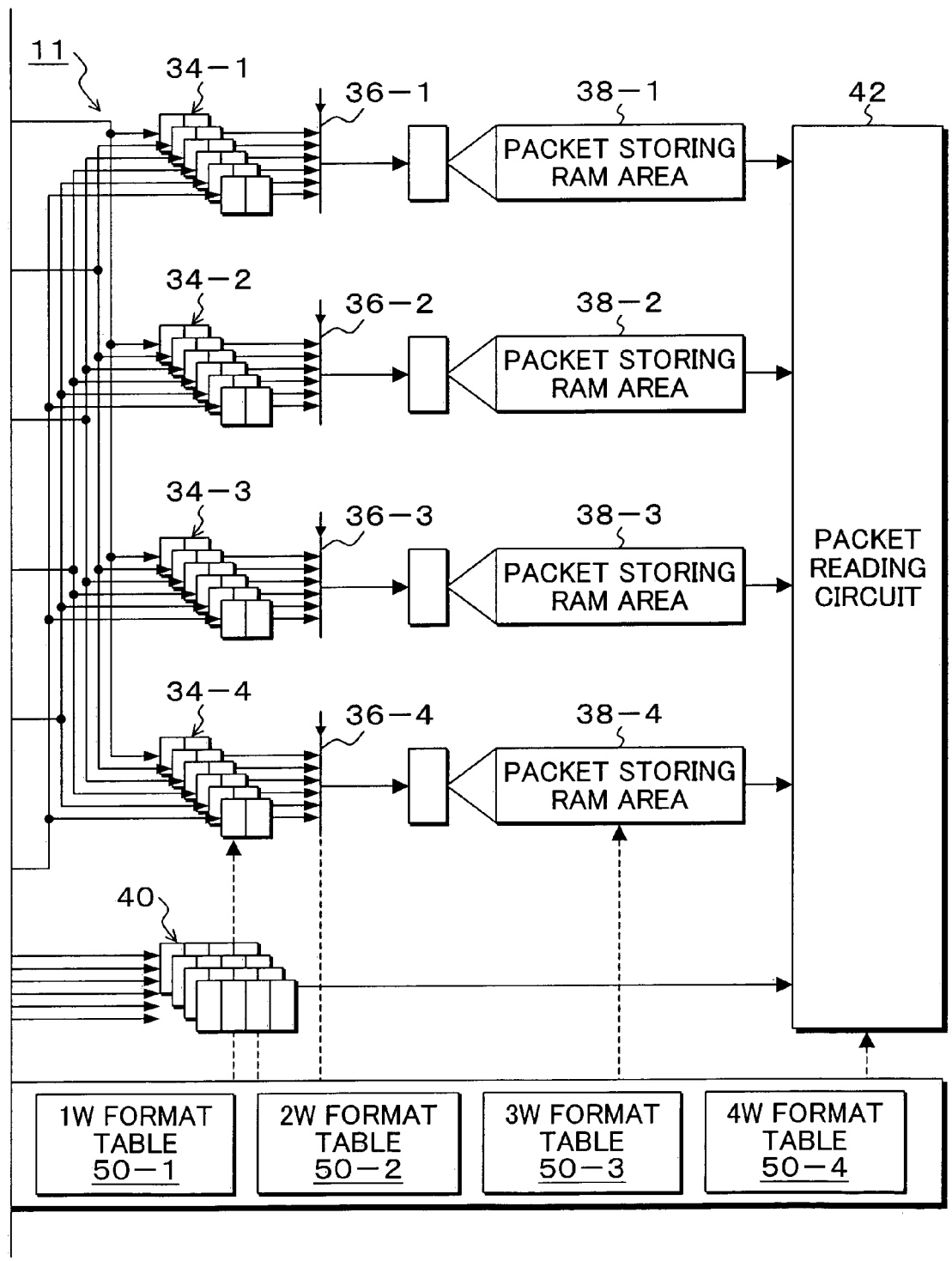

FIGS. 5A to 5B are block diagrams of an embodiment of a data queue control circuit 11 of the present invention provided to the system controller 12 of FIG. 4. In FIGS. 5A to 5B, the data queue control circuit 11, as shown in FIG. 4, receives packets by the plurality of interfaces from the side of the memory controllers 18-1 and 18-2 and the I/O controller 20, executes queuing, thereafter, reads the packets and transfers the packets to the side of the CPUs 14-1 to 14-4. In this example, packets 25-1 to 25-6 from six (6) interfaces are received by IF latches working as receiving latches (hereinafter, referred to as "IF latches") 28-1 to 28-6 at timings corresponding to each interface. Packet control circuits 30-1 to 30-6 are provided following the IF latches 28-1 to 28-6 and the packet control circuits 30-1 to 30-6 are respectively provided with format determining circuits 32-1 to 32-6 necessary for the data queue control of the present invention.

Figure 6:
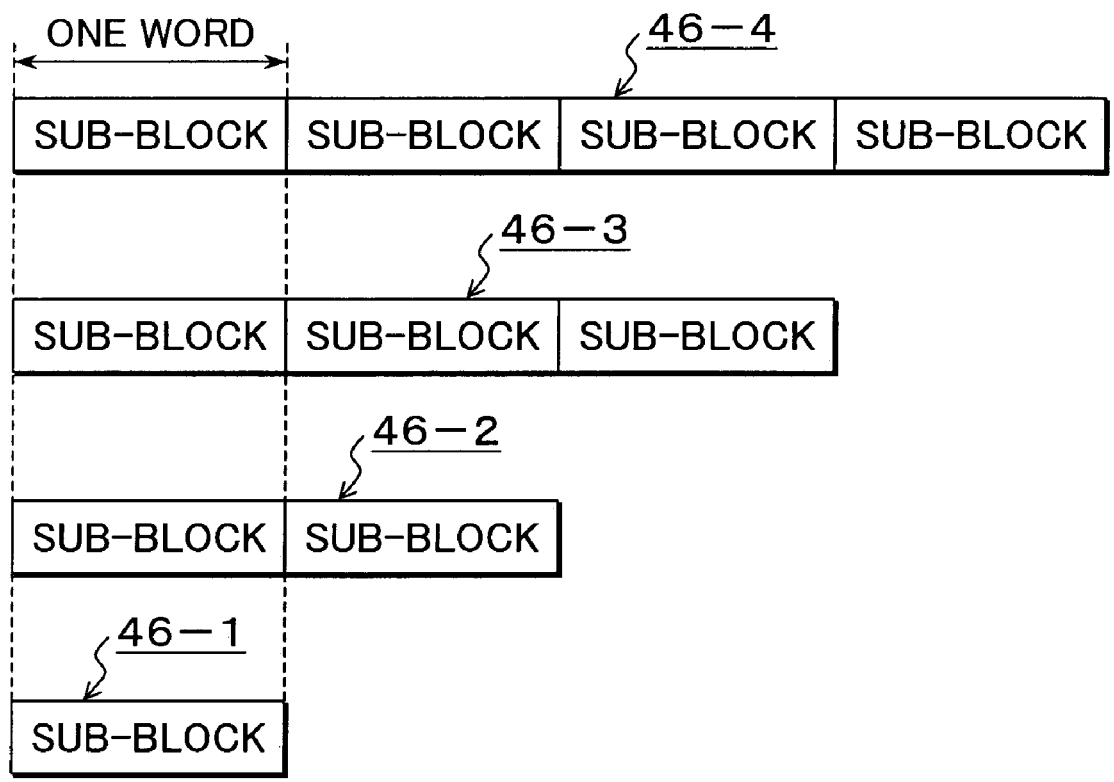
FIG. 6 is an explanatory view of received packets of FIGS. 5A to 5B.

Following the packet control circuits 30-1 to 30-6, buffer RAMs 34-1 to 34-4 working as buffer queues are provided. Here, as each of the packets 25-1 to 25-6 received by the IF latches 28-1 to 28-6, as shown in FIG. 6, a four (4)-word packet 46-4 having the longest packet length is received and, in addition, a three (3)-word packet 46-3, a two (2)-word packet 46-2 or one (1)-word packet 46-1 and packets of which data length are various due to restrictions on data length in the interfaces are received at timings corresponding to each interface. Here, the four (4)-word packet 46-4 of FIG. 6 is in the basic packet format and, according to the format, block data corresponding to four (4) words are divided into sub-blocks by dividing into four (4) and this sub-block is handled as one (1) word.

Referring again to FIGS. 5A to 5B, four (4) units of the buffer RAMs 34-1 to 34-4 are arranged corresponding to the largest number of words of the packets received by the IF latches 28-1 to 2-6. Each of the buffer RAMs 34-1 to 34-4, taking an example of, for example, the buffer RAM 34-1, consists of a group of six (6) buffer RAMs corresponding to the IF latches 28-1 to 28-6. This point is same for the other buffer RAMs 34-2 to 34-4. Following the buffer RAMs 34-1 to 34-4, intervening circuits 36-1 to 36-4 are provided and each of the intervening circuits 36-1 to 36-4 selects corresponding one (1) RAM area among the six (6) RAM areas in each of the buffer RAMs 34-1 to 34-4 and reads the received packets by the control of the intervening circuits 36-1 to 36-4 corresponding to the order of reception of the packets by the IF latches 28-1 to 28-6. Following the intervening circuits 36-1 to 36-4, packet storage RAMs 38-1 to 38-4 are provided and, similarly to the buffer RAMs 34-1 to 34-4, four (4) units thereof corresponding to the largest number of words of the packets received by interface latches (hereinafter, referred to as "IF latches") 28-1 to 28-6 are arranged in parallel. Following the packet storage RAMs 38-2 to 38-4, a packet reading circuit 42 is provided. In addition, a format information storage unit 40 is provided and corresponding format information for the time when storing the corresponding received packets determined by any of the format determining circuits 32-1 to 32-6 into the packet storage RAMs 38-1 to 38-4, is stored in this format information storage unit 40 and, when the received packets are read from the packet storage RAMs 38-1 to 38-4 by the packet reading circuit 42, specifies an effective storage position, i.e., effective word position from the corresponding format information stored in the format information storage unit 40 and executes reading of the received packets. Furthermore, a control unit 44 that executes total control is provided to the data queue control circuit 11, and a format determination table 48, a one (1)-word format table 50-1, a two (2)-word format table 50-2, a three (3)-word format table 50-3 and a four (4)-word format table 50-4 are stored in the control unit 44. Each of the tables provided to the control unit 44 is referred to and utilized by the format determining circuits 32-1 to 32-6 as a common table. However, as another embodiment, each of the tables may be arranged respectively in each of the format determining circuits 32-1 to 32-6.

FIGS. 7A to 7D are explanatory views of a state of writing according to a first to a fourth formats into the packet storage RAMs 38-1 to 38-4, for a four (4)-word packet as a target. FIG. 7A shows a state of writing according to the first format by the four (4)-word packet and, in the writing according to the first format, writing in order of blocks from a first sub-block to a fourth sub-block, i.e., the order of words into the packet storage RAMs 38-1 to 38-4 is executed. FIG. 7B shows the second format in the four (4)-word-packet and, in the second format, sub-blocks are stored one after another from the first sub-block to the fourth sub-block with the second packet storage RAM 38-2 at the head. FIG. 7C shows the third format of the four (4)-word packet and, in the third format, the first sub-block is stored with the third packet storage RAM 38-1 at the head and there remaining sub-blocks are stored one after another in a manner circulating forward after the first sub-block. Moreover, FIG. 7D shows the fourth format of the four (4)-word packet and the first sub-block is stored placing the fourth packet storage RAM 38-4 at the head and, returning from the first sub-block to the first packet storage RAM 38-1, the successive sub-block are stored. Such determination of the first format to the fourth format for the four (4)-word packet is executed corresponding to the availability of the buffer RAMs 34-1 to 34-4 shown in FIGS. 5A to 5B. The first sub-block at the head is stored at the position of a packet storage RAM having the highest availability and, after the first sub-block, the remaining sub-blocks are stored following the first sub-block.

FIGS. 8A to 8D are explanatory views of a state of writing of the packet storage RAMs according to a first to a fourth formats in a three (3)-word packet. FIG. 8A shows the first format of the three (3)-word packet. In the first format, the first sub-block at the head is stored in the packet storage RAM 34-1 having the highest availability and the remaining sub-blocks are stored following the first sub-block. The packet storage RAM 38-4 is unused because a fourth block does not exist. FIG. 8B shows the second format of the three (3)-word packet and the first sub-block at the head is stored in the packet storage RAM 38-2 having the highest availability and the remaining sub-blocks are stored following the first sub-block. The first packet storage RAM 38-1 is unused because a fourth word does not exist. FIG. 8C shows the third format of the three (3)-word packet and the first sub-block at the head is stored in the third packet storage RAM 38-3 having the highest availability and the remaining two sub-blocks that follow are stored following the first sub-block. The second packet storage RAM 38-2 is unused because a fourth sub-block does not exist. FIG. 8D shows the fourth format of the three (3)-word packet and the first sub-block at the head is stored in the fourth packet storage RAM 38-4 having the highest availability and, the following sub-blocks are respectively stored returning to the first and the second packet storage RAMs 38-1 and 38-2. The third packet storage RAM 38-3 is unused because a fourth sub-block that is the fourth word does not exist.

FIGS. 9A to 9D show a state of writing of the packet storage RAMs according to a first to a fourth format in a two (2)-word packet. FIG. 9A shows the first format of the two (2)-word packet, FIG. 9B shows the second format of the two (2)-word packet, FIG. 9C shows the third format of the two (2)-word packet and FIG. 9D shows the fourth format of the two (2)-word packet. A storage position having the highest availability in each of the first format, the second format, the third format and the fourth format is, similarly to the three (3)-word packet of FIGS. 8A to 8D, the position of the first packet storage RAM 38-1 of FIG. 9A in the first format, the second packet storage RAM 38-2 of FIG. 9B in the second format, the third packet storage RAM 38-3 of FIG. 9C in the third format and the fourth packet storage RAM 38-4 of FIG. 9D in the fourth format. Therefore, the first sub-block at the head is stored in the respective storage RAM having the highest availability the second sub-block is stored following the first sub-block. When the first sub-block is stored in the last packet storage RAM 38-4 as shown in FIG. 9D, the second sub-block is returned to and stored in the first packet storage RAM 38-1.

FIGS. 10A to 10D are explanatory views of a state of writing of the packet storage RAMs according to a first to a fourth format of a one (1)-word packet. The one (1)-word packet is applied with the first format of FIG. 10A, the second format of FIG. 10B, the third format of FIG. 10C and the fourth format of FIG. 10D. As to the content, the writing formats have the second sub-block of each of the formats left unused and the storage state of the first sub-block remained, as in the two (2)-word packet of FIGS. 9A to 9D.

These first to fourth formats in the one (1)- to four (4)-word packets shown in FIGS. 7A to 7D to FIGS. 10A to 10D are determined dynamically based on the format determination table 48 shown in FIG. 11. The format determination table 48 of FIG. 11 targets the case where the buffer RAMs 34-1 to 34-4 shown in FIG. 6 are storage areas for addresses, and states of storage of buffer RAMs 34-1 to 34-4 are divided into eight (8) cases from a first case to an eighth case. For these cases from the first case to the eighth case that are buffer storage states, as shown on the right thereof, two (2) storage states of RAM addresses in the buffer RAMs 34-1 to 34-4 are represented as "1" for being stored and as "0" for being vacant. When a storage state represented using two (2) bits can be obtained for the buffer RAMs 34-1 to 34-4, any of the first format to the fourth format to be a format number shown on the right thereof is determined. Here, as an applicable number of the packet words, though the first case to the fourth case are applied to the first word packet to the fourth word packet, the fifth case to the eighth case are applied only to the one (1)-word packet and the two (2)-word packet.

FIGS. 12A to 12D are explanatory views of a format table that stores the format information designated from the format number in the format determination table 48 of FIG. 11, and consists of a four (4)-word format table 50-4 of FIG. 12A, a three (3)-word format table 50-3 of FIG. 12B, a two (2)-word format table 50-2 of FIG. 12C and a one (1)-word format table 50-1 of FIG. 12D. For each of the format tables that stores the format information, taking an example of the four (4)-word format table 50-4 of FIG. 12A, values one (1) to four (4) indicating the order of the writing of the buffer RAMs 34-1 to 34-4 are stored on the right corresponding to each of the first format to the fourth format that are format numbers and zero (0) indicates an unused RAM. For the four (4)-word format table 50-4 of FIG. 12A, all of the four (4) buffer RAMs 34-1 to 34-4 are used for the first format to the fourth format and, when the format number is different, at which position the sub-block at the head of a packet is written varies according to the state of availability. In the three (3)-word format table 50-3 of FIG. 12B, three (3) of four (4) storage areas are used for the first format to the fourth format, the remaining one (1) is unused and a first writing position is shifted backward one by one according to the order of the buffer RAMs, in order of the format. In the two (2)-word format table 50-2 of FIG. 12C, two (2) of the four (4) areas of the buffer RAMs are used for any of the first format to the fourth format, the remaining two (2) are unused areas indicated by zero (0) and, similarly, the position for writing the sub-block at the head is shifted backward one by one according to the order of format number. In the one (1)-word format table 50-1 of FIG. 12D, one (1) of the four (4) storage areas of the buffer RAMs is used for any of the format numbers, the remaining three (3) each indicated by zero (0) are unused and the position to be the storage area indicated by one (1) is shifted backward one by one from the position at the head of each of the buffer RAMs according to order of the format numbers.

FIGS. 13A to 13C are explanatory views of writing in the case where the first format is determined as the format number because the state of storage of the buffer RAM 34-1 to 34-4 is determined to be the first case of the format determination table 48 of FIG. 11 when the four (4)-word packet is received. FIG. 13A shows the received four (4)-word packet received at a timing and word data for words from a first word to a fourth word are represented by B1, B2, B3 and B4. In this case, it is assumed that all the storage areas are vacant for both of a first row (an address at the head) on the lower side in the buffer RAMs 34-1 to 34-4 shown in FIG. 13C and a second row (a second address) above the first row. When such availability of the buffer RAMs 34-1 to 34-4 has been detected and the format determination table 48 has been referred to, the state of storage is determined to correspond to the first case and, therefore, the first format is determined as the format number. Because this first format of the four (4)-word packet is the first format of the four (4)-word format table 50-4 of FIG. 12A, the storage position for the buffer RAMs 34-1 to 34-4 according to the first format as shown in FIG. 13B has a same sequence for the received four (4)-word packet as that of FIG. 6, and the word data B1 to B4 are stored into the buffer RAMs 34-1 to 34-4 as in the sequence.

FIGS. 14A to 14C are explanatory views for the case where the second format is determined because the state of storage of the buffer RAMs is the second case when the four (4)-word packet is received. In this case, when the received four (4)-word packet of FIG. 14A has been received, as shown in FIG. 14C, the buffer RAMs 34-1 to 34-4 are in a state of storage of the second case of FIG. 11. Therefore, the second format is determined as the format number and, as shown in the second format of FIG. 14B from the four (4)-word format table 50-4 of FIG. 12A, the word data B1, B2, B3 and B4 are stored one after another placing at the head the buffer RAM 34-2 that is the storage position having the highest availability.

FIGS. 15A to 15C are explanatory views of writing according to the third format determined in the state of the third case of the buffer RAMs 34-1 to 34-4 when the four (4)-word packet is received and this state of writing is obtained from the format determination table 48 of FIG. 11 and the four (4)-word format table 50-4 of FIG. 12A. In the third format, the word data A1 and A2 are already stored in the first row of the buffer RAMs 34-1 and 34-2 of FIG. 15C and, judging from the order of storage, the buffer RAM having the highest availability is the third buffer RAM 34-3 and, the word data B1 to B4 of the four (4) words currently being received are stored in the buffer RAMs 34-1 to 34-4 arranging the word data B1 to B4 as shown in FIG. 15B from this position.

FIGS. 16A to 16C are explanatory views of the writing for the case where the fourth format is determined because the state of storage of the buffer RAMs 34-1 to 34-4 corresponds to the fourth case of the format determination table 48 of FIG. 11 when the four (4) word packet is received. In this fourth format, because the buffer RAMs 34-1 to 34-3 of FIG. 16C are already used by the word data A1 to A3 and only the fourth buffer RAM 34-4 is vacant, the word data B1 to B4 currently being received are rearranged in order of the storage of the fourth format of FIG. 16B and are stored in the buffer RAMs 34-1 to 34-4 taking this fourth buffer RAM 34-4 as the head position.

FIGS. 17A to 17C, FIGS. 18A to 18C, FIGS. 19A to 19C and FIGS. 20A to 20C are explanatory views of the writing into the buffer RAMs 34-1 to 34-4 respectively in the case where the first format, the second format, the third format and the fourth format are respectively determined from the first case, the second case, the third case and the fourth case according to the storage state of the buffer RAMs 34-1 to 34-4 for a received three (3)-word packet.

Furthermore, FIGS. 21A to 21D, FIGS. 22A to 22D, FIGS. 23A to 23D and FIGS. 24A to 24D are explanatory views of writing into the buffer RAMs 34-1 to 34-4 respectively in the case where the first format, the second format, the third format and the fourth format are respectively determined because the first case, the second case, the third case and the fourth case and the storage state are determined for a received two (2)-word packet. Among those, FIGS. 21A to 21C, FIGS. 22a to 22C, FIGS. 23A to 23C and FIGS. 24A to 24C are same as the cases of the received four (4)-word packet and the received three (3)-word packet. However, FIG. 21D, FIG. 22D, FIG. 23D and FIG. 24D show states where the word data A1 to A4 of a packet received in advance are already stored in the first row (head address) of the buffer RAMs 34-1 to 34-4 and, in this case, writing of the word data is executed to the buffer RAMs 34-1 to 34-4 according to the determination of the first format, the second format, the third format or the fourth format judged from the state of the storage of the second row that is the second address.

FIGS. 25A to 25C, FIGS. 26A to 26C, FIGS. 27A to 27C and FIGS. 28A to 28C show writing according to the first format, the second format, the third format or the fourth format of the first case, the second case, the third case and the fourth case of the buffer RAMs 34-1 to 34-4 in a received one (1)-word packet. Furthermore, as to the state where the word data A1 to A4 of a packet received in advance are stored in the first rows (head addresses) of the buffer RAMs 34-1 to 34-4, as shown in FIG. 25D, FIG. 26D, FIG. 27D and FIG. 28D, the fifth case, the sixth case, the seventh case or the eighth case is determined for the storage state of the second row and the first format, the second format, the third format or the fourth format is determined and the writing is executed.

Figure 29D:
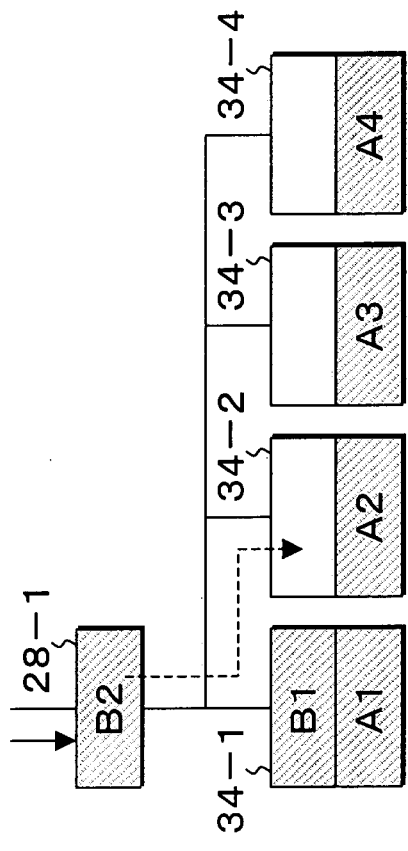
Figure 29E:
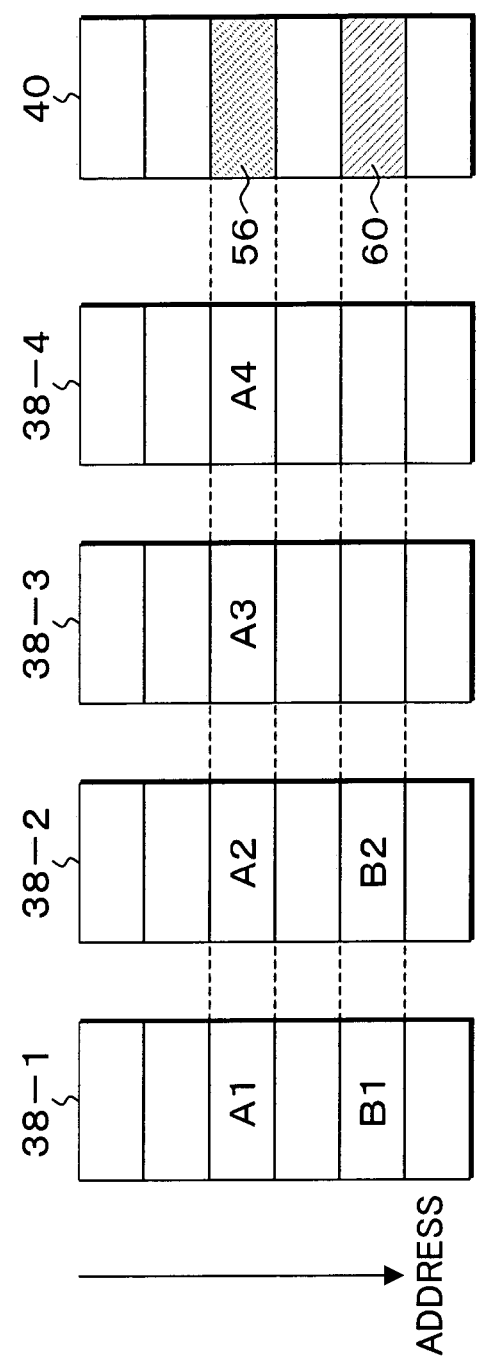

FIGS. 29A to 29E are explanatory views of writing into the buffer RAMs 34-1 to 34-4 in a storage state of the first case in the case where a two (2)-word packet (B1 and B2) is received following the four (4)-word packet (A1, A2, A3 and A4) by the data queue control circuit 11 of FIGS. 5A to 5B, and a writing operation into the packet RAMs 38-1 to 38-4 after that. FIG. 29A shows a process cycle given by the timing control of the control unit 44 of FIGS. 5A to 5B and, as shown in FIG. 29B, it is assumed that, for example, a two (2)-word packet 54 is received after a four (4)-word packet 52 has been received by the IF latch 28-1. FIG. 29C shows a storage state of an eighth cycle of FIG. 29A and, when the word data B1 at the head of the two (2)-word packet is latched by the IF latch 28-1, the word data A1 to A4 of the four (4)-word packet 52 received in advance are already stored in the first row that is the head address of the buffer RAMs 34-1 to 34-4. The storage state in the first case is determined by referring to the format determination table 48 from such a storage state as above and, as a result, the first format is determined as the format number. When the first format has been determined, the word data B1 latched by the IF latch 28-1 is stored into the buffer RAM 34-1 according to the first format. FIG. 29D shows a state of the next ninth cycle and the second word data B2 is latched by the IF latch 28-1 and, in this case, the preceding word data B1 is stored in the second row of the buffer RAM 34-1 and the first format is determined as the format. Therefore, the word data B2 in the IF latch 28-1 are stored in the second buffer RAM 34-2. FIG. 29E shows the state where the four (4)-word packet 52 and the two (2)-word packet 54 are stored in the packet RAMs 38-1 to 38-4 after undergoing the storage in the buffer RAMs 34-1 to 34-4 and, in this case, pieces of format information 56 and 58 determined when the word data have been stored in the buffer RAMs 34-1 to 34-4 are stored in the format information storage unit 40 shown on the right. When the packet reading circuit 42 shown in FIGS. 5A to 5B reads the received packets from the packet storage RAMs 38-1 to 38-4, the format information in this format information storage unit 40 shows in which packet storage RAM the effective word data are present and what the order of the word data is. By reading the packets using this format information, the received packets stored divided into words can be re-constructed and sent onto the CPU side. Similarly to FIGS. 29A to 29E, FIGS. 30A to 30C are explanatory views of writing into the buffer RAMs 34-1 to 34-4 in a storage state in the second case and a writing operation into the packet storage RAMs 38-1 to 38-4 after that, when the two (2)-word packet is received following the four (4)-word packet.

Figure 30A:
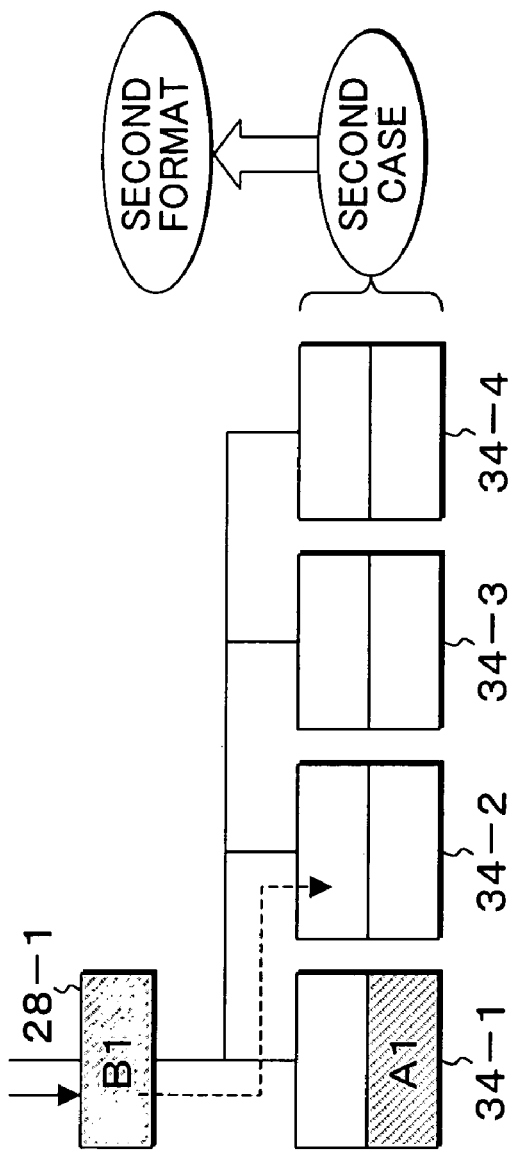
Figure 30B:
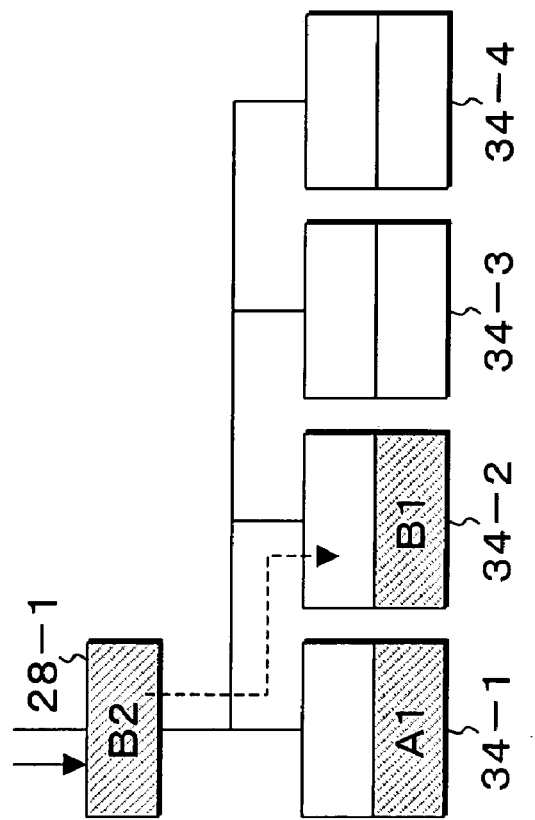
Figure 30C:
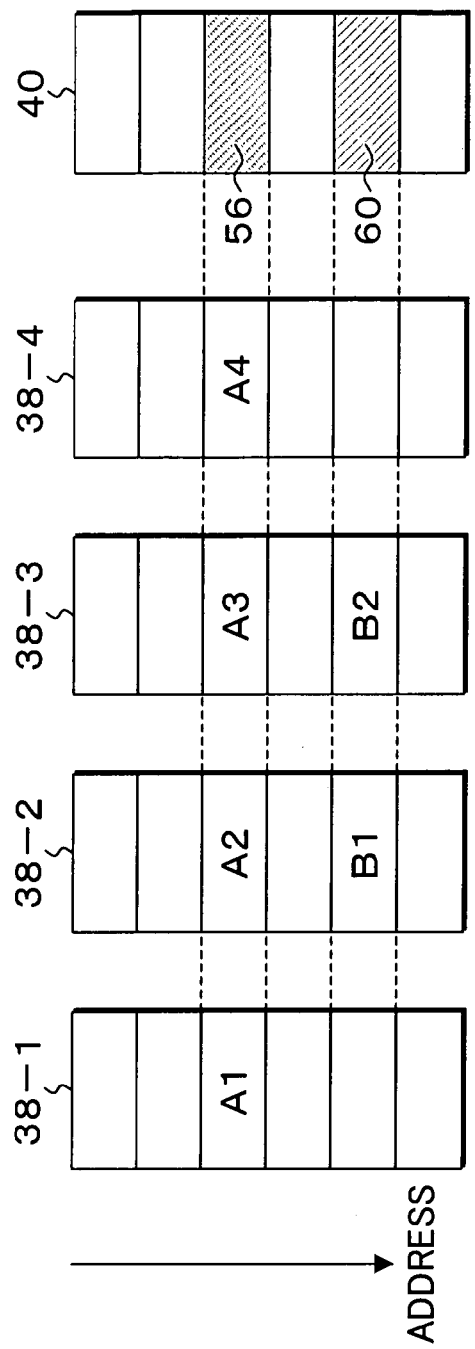

In FIGS. 30A to 30C, the state of packet reception is same as that of FIGS. 29A to 29E, and FIGS. 30A to 30C shows a state where the word data B1 at the head of the two (2)-word packet 54 is latched by the IF latch 28-1 in the eighth cycle. In this case, the word data A1 of the four (4)-word packet preceding at the head position in the first row is remained in the buffer RAMs 34-1 to 34-4. Referring to the format determination table 48 of FIG. 11 from this storage state, this state corresponds to the second case as the storage state and, as a result, the second format is determined. When the second format has been determined in this manner, the word data B1 of the IF latch 28-1 is stored in the first row of the second buffer RAM 34-2 according to the second format. FIG. 30B shows the ninth cycle of FIG. 29A and the second word data B2 is latched in the IF latch 28-1 and the word data B1 that have been latched in advance is stored in the first row of the buffer RAM 34-2. In this case, because the second format has been determined, the word data B2 in the IF latch 28-1 is stored in the first row of the third buffer RAM 34-3. FIG. 30C shows the storage state of the packet storage RAMs 38-1 to 38-4 transferred after being stored into the buffer RAMs 34-1 to 34-4. Corresponding to this, in the format information storage unit 40 on the right, format information 56 is stored for the word data A1 to A4 of the two (2)-word packet and format information 60 is stored for the next word data B1 and B2. By referring to the format information pieces 56 and 60 when the packets are read, the effective storage position and the order of storage of the word data in the packet storage RAMs 38-1 to 38-4 can be recognized and the received packets can be re-constructed and transferred onto the CPU side. Available addresses portion in the packet storage RAMs 38-1 to 38-4 of FIG. 29E and FIG. 30C are used as the positions at which the word data of the packets received by the other IF latches are stored. However, because these received data are not referred to, those portions are available spaces.

Figure 31A:
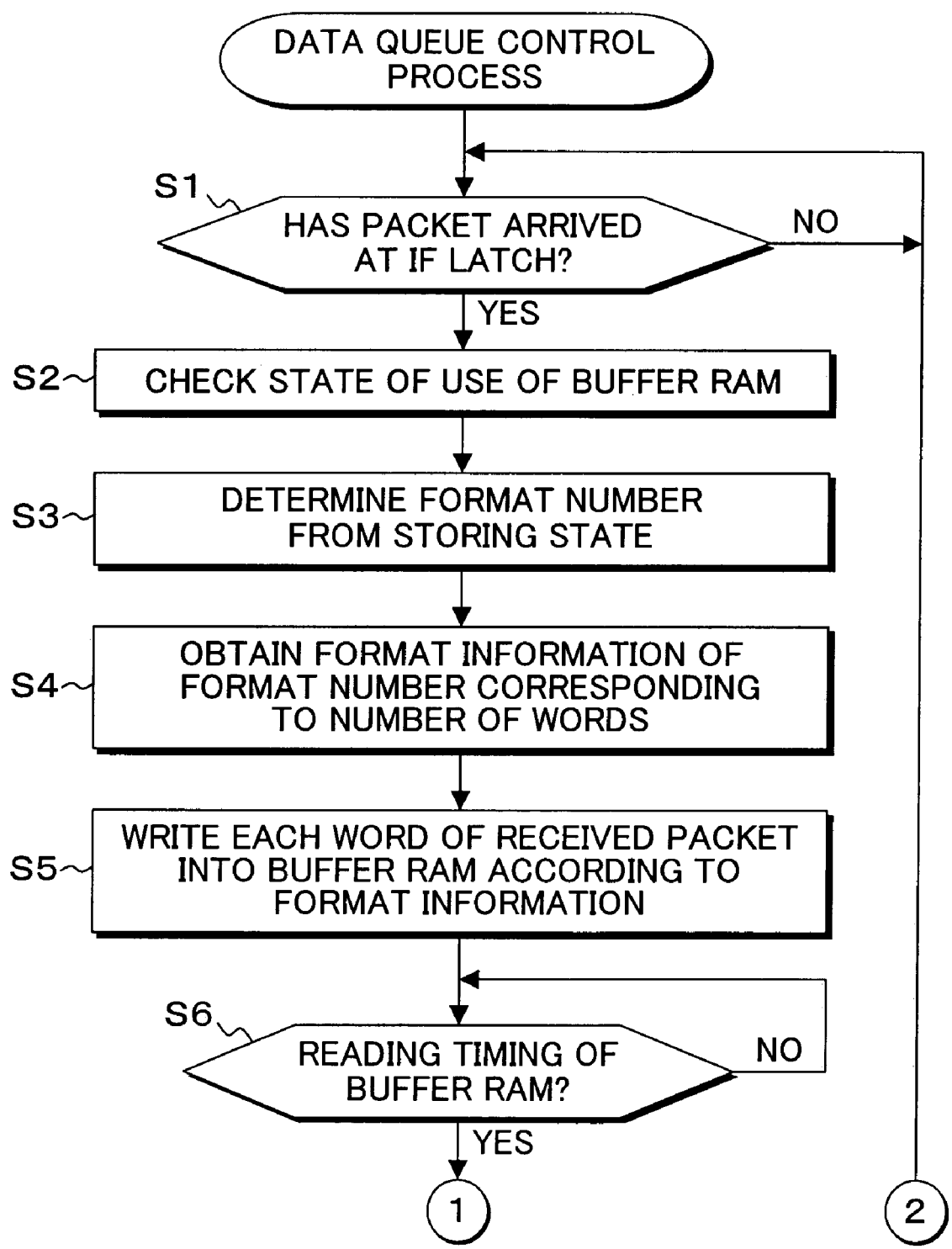
FIGS. 31A and 31B are a flowchart of a data queue control process according to the embodiment of FIGS. 5A to 5B.
Figure 31B:
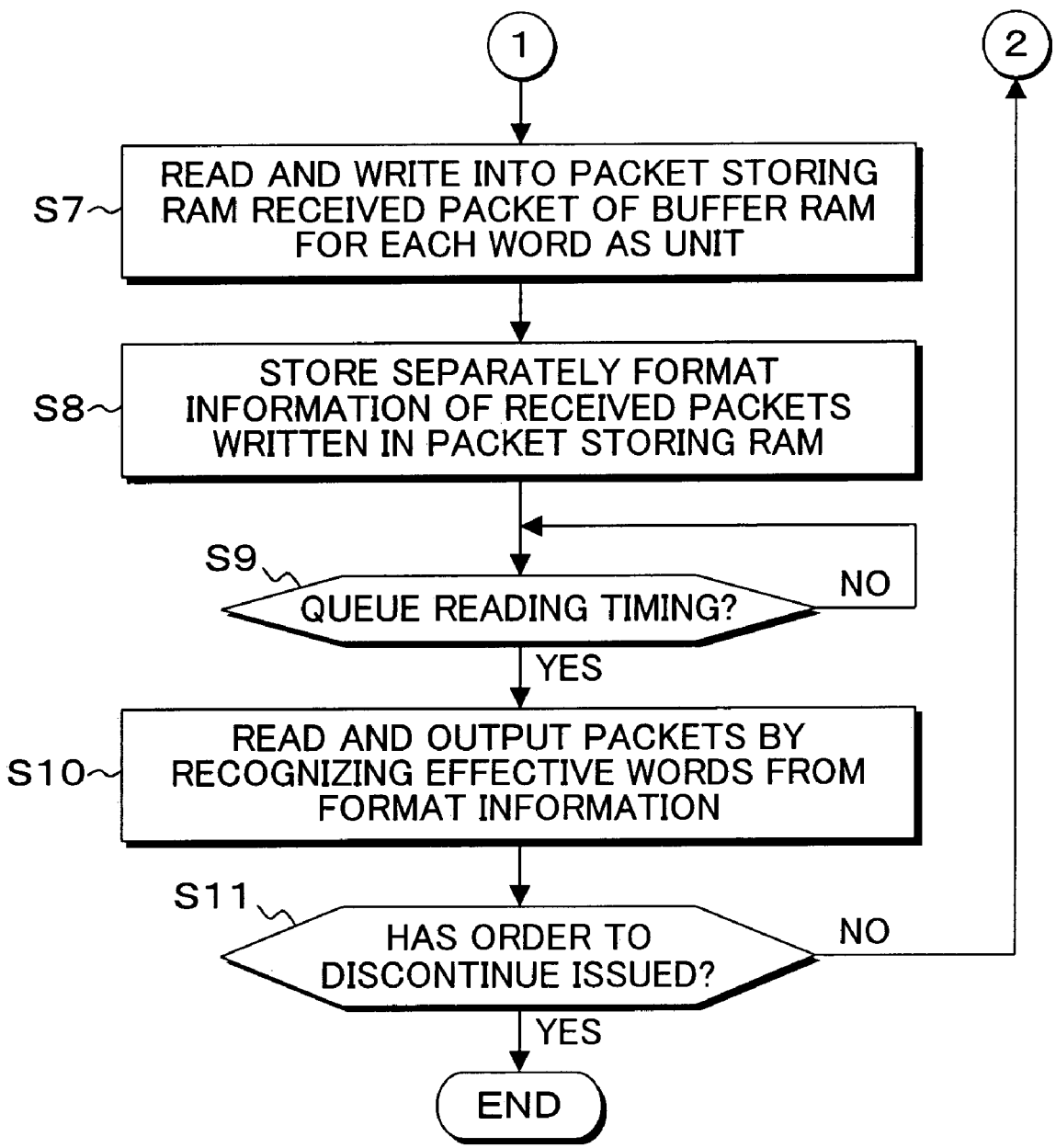

FIGS. 31A and 31B are a flowchart of the data queue control process according to the embodiment of FIGS. 5A to 5B and shows processes from reception of packets by a specific IF latch to storage of queue and further to reading of queue. Therefore, in a practical data queue storage process, a process program shown in the flowchart of FIGS. 31A and 31B is executed in parallel as a multi-task process for each reception process of an IF queue that receives packets. In FIGS. 31A and 31B, whether or not a packet has arrived at the IF latch that is a target is checked at step S1. If the packet has arrived, the process is advanced to step S2 at which the state of usage of the buffer RAMs 34-1 to 34-4 at this time is recognized. Then, a format number is determined from the format determination table 48 of FIG. 11 at step S3. Next, format information for the format number corresponding to the number of the words of the received packets is obtained at step S4 and each word of the received packet is written word by word into the buffer RAMs according to the format information at step S5. When storage of the packet into the buffer RAMs 34-1 to 34-4 has been finished as described above, timing for reading the buffer RAMs is checked at step S6 and, when the timing for reading has been determined, the received packet in the buffer RAMs is read in parallel word by word and is written into the packet storage RAMs 38-1 to 38-4 at step S7. Next, the format information of the received packet that has been written into the packet storage RAMs 38-1 to 38-4 is separately stored into the format information storage unit 40 at step S8. Then, timing for reading the packet storage RAMs is checked at step S9. Then, when the timing for reading has been determined, the storage positions of the effective words in the packet storage RAMs 38-1 to 38-4 are recognized from the format information stored separately, the packet is read, the packet is re-constructed by arranging the word in the order thereof from the order of storage obtained from the format information and the packet is outputted onto the CPU side at step S10. Such processes at steps S1 to S10 are repeated for each arrival of a packet until an order to discontinue is issued at step S11.

The present invention further provides a program according to the data queue control process procedure shown in the flowchart of FIGS. 31A and 31B executed by a computer constituting the system controller 12 as show in FIG. 4. In this case, for the circuit shown in FIGS. 5A to 5B, the portion other than the latch circuits and the RAMs can be provided as software or firmware that realizes the function of, for example, the control unit 44, using control by the program. The above embodiment takes an example of the case where the data queue control is executed receiving packets having data lengths varying in a range from one (1) to four (4) words with four (4) words as the longest word length, obtained by dividing one (1) block data into four (4) sub-blocks, as received packets. However, the number of divisions n for dividing one (1) block of a received packet into sub-blocks can be determined appropriately as necessary and can be set appropriately such as, for example, n=six (6) blocks and n=eight (8) blocks. Furthermore, the above embodiment takes an example of a two (2)-address configuration for the buffer RAM 34-1 to 34-4. However, the number of the addresses of the buffer RAMs 34-1 to 34-4 may be increased. Yet furthermore, the above embodiment takes an example of the case where packets are received from six (6) interfaces. However, this number of the interfaces may be determined appropriately as necessary and, basically, a configuration is taken such that the number of the packet storage queues is fewer than the number of the interfaces. The present invention encompasses any appropriate variations without impairing the object and advantages thereof and, is not intended to be restricted by the numerical values indicated in the above embodiment.

What is claimed is:

1. A data queue control circuit comprising:
a plurality of receiving latches configured to receive packets having various number of words from a plurality of interfaces;
buffer queues of a number equal to a largest number of words of a received packet, the buffer queues storing separately on a word by word basis the packets received by the receiving latches;
packet storage queues of a number equal to the number of the buffer queues, the packet storage queues storing packets read from the buffer queues;
a format determining circuit configured to define in advance a plurality of types of writing formats, which are patterns for writing word data of a received packet into said buffer queues, corresponding to availabilities of the buffer queues, the format determining circuit, when a packet is received by one of the plurality of receiving latches, determining dynamically a writing format corresponding to a current availability of the buffer queues;
a packet control circuit configured to store separately on a word by word basis the received packets into the buffer queues, in conformity with the writing format determined by the format determining circuit;
a format information storage unit configured to store formats determined by the format determining circuit; and
a packet reading circuit configured to recognize positions to store the word data based on the formats stored in the format information storage unit, to read the packets from the packet storage queues,
wherein an input of said packet control circuit is connected to an output of said receiving latch and said format determining circuit is arranged in said packet control circuit, an input of said buffer queue is connected to an output of said packet control circuit, an input of said packet storage queue is connected to an output of said buffer queue, an input of said packet read circuit is connected to an output of said packet storage queue, and an input of said packet read circuit is connected to an output of said packet storage queue and an output of said format information storage unit.

2. A data queue control circuit according to claim 1, wherein the format determining circuit defines a writing format that causes the words of the received packet to be sequentially stored into the plurality of buffer queues in order of descending availability of the buffer queues.

3. A data queue control circuit according to claim 1, wherein the format determining circuit defines a writing format that causes the words of the received packet to be sequentially stored into the plurality of buffer queues in order of descending availability of the buffer queues when the received packet has full words.

4. A data queue control circuit according to claim 1, wherein the format determining circuit defines a writing format that causes the words of the received packet to be sequentially stored into the plurality of buffer queues in order of descending availability of the buffer queues when the received packet has vacant words.

5. A data queue control circuit according to claim 1, wherein the format determining circuit, when the received packet has n, words n being an arbitrary integer, which is a maximum packet length,
defines a writing format that causes the n words to be sequentially stored into n buffer queues in order of descending availability of the buffer queues, and wherein
the format determining circuit, when the received packet has words fewer than n words, defines a writing format that causes each word fewer than n words to be sequentially stored into n buffer queues in order of descending availability of the buffer queues.

6. A data queue control circuit according to claim 1, wherein the format determining circuit, when the received packet has four (4) words, defines a writing format that causes the four (4) words to be sequentially stored into four (4) buffer queues in order of descending availability of the buffer queues, and wherein the format determining circuit, when the received packet has three (3) words, two (2) words or one (1) word, defines a writing format that causes each word of the three (3) words, two (2) words or one (1) word to be sequentially stored into four (4) buffer queues in order of descending availability of the buffer queues.

7. A data queue control circuit according to claim 1, wherein the plurality of buffer queues consist of RAMs each having at least two (2) addresses with a size of one (1) word, and wherein the format determining circuit defines a writing format corresponding to availability of a RAM configuration of the plurality of buffer queues and determines a writing format corresponding to the availability of the RAM configuration of the plurality of buffer queues at a time when the packets are received.

8. A data queue control circuit according to claim 1, wherein each of the buffer queues disposed corresponding to each word of the received packets comprises a buffer queue group in a parallel arrangement of corresponding number of buffer queues to a number of the interfaces for the receiving latches, and wherein each of the buffer queues reads each word of the received packets for each receiving latch stored in each buffer queue group, for each of the received packets using a plurality of intervening circuits disposed corresponding to respective buffer queue groups, to store respective read words into the packet storage queues.

9. A data queue control circuit according to claim 1, wherein each receiving latch receives the packets from the interfaces of resources such as a memory controller and an input/output controller, and wherein the packet reading circuit outputs the packets read from the packet storage queues to a process module such as a CPU.

10. A data queue control method comprising:

receiving by a plurality of receiving latches packets having various numbers of words from a plurality of interfaces;

separating on a word by word basis the packets received by the receiving latches and storing the separated packets into buffer queues of a number equal to a largest number of words of a received packet, storing the packets read from the buffer queues into packet storage queues of a number equal to the number of the buffer queues;

defining in advance a plurality of types of writing formats, which are patterns for writing word data of the received packet into said buffer queues, corresponding to availabilities of the buffer queues, and, when a packet is received by one of the plurality of receiving latches, determining dynamically a writing format corresponding to a current availability of the buffer queues;

storing separately on a word by word basis the received packets into the buffer queues, in conformity with the defined writing formats;

storing the defined writing formats; and recognizing positions to store the word data based on the stored defined writing formats, and reading the packets from the packet storage queues.

11. A data queue control method according to claim 10, wherein the defining of the writing formats includes defining a writing format that causes the words of the received packet to be sequentially stored into the plurality of buffer queues in order of descending availability of the buffer queues.

12. A data queue control method according to claim 10, wherein the defining of the writing formats includes defining a writing format that causes the words of the received packet to be sequentially stored into the plurality of buffer queues in order of descending availability of the buffer queues when the received packet has full words.

13. A data queue control method according to claim 10, wherein the defining of the writing formats includes defining a writing format that causes the words of the received packet to be sequentially stored into the plurality of buffer queues in order of descending availability of the buffer queues when the received packet has vacant words.

14. A data queue control method according to claim 10, wherein the defining of the writing formats includes, when the received packet has n words, n being an arbitrary integer, which is a maximum packet length, defining a writing format that causes the n words to be sequentially stored into n buffer queues in order of descending availability of the buffer queues, and wherein the defining of the writing formats includes, when the received packet has words fewer than n words, defining a writing format that causes each word fewer than n words to be stored in order of word into n buffer queues in order of descending availability of the buffer queues.

15. A data queue control method according to claim 10, wherein the defining of the writing formats includes, when the received packet has four (4) words, defines a writing format that causes the four (4) words to be sequentially stored into four (4) buffer queues in order of descending availability of the buffer queues, and wherein the defining of the writing formats includes, when the received packet has three (3) words, two (2) words or one (1) word, defining a writing format that causes each word of the three (3) words, two (2) words or one (1) word to be sequentially stored into four (4) buffer queues in order of descending availability of the buffer queues.

16. A data queue control method according to claim 10, wherein the plurality of buffer queues consist of RAMs each having at least two (2) addresses with a size of one (1) word, and wherein the defining of the writing formats includes defining a writing format corresponding to an availability of a RAM configuration of the plurality of buffer queues and determining a writing format corresponding to the availability of the RAM configuration of the plurality of buffer queues at a time when the packets are received.

17. A data queue control method according to claim 10, wherein each of the buffer queues disposed corresponding to each word of the received packets comprises a buffer queue group in a parallel arrangement of corresponding number of buffer queues to a number of the interfaces for the receiving latches, and wherein each of the buffer queues reads each word of the received packets for each receiving latch stored in each buffer queue group, for each of the received packets using a plurality of intervening circuits disposed corresponding to respective buffer queue groups, to store respective read words into the packet storage queues.

18. A data queue control method according to claim 10,
   wherein each receiving latch receives the packets from the interfaces of resources such as a memory controller and an input/output controller, and
   wherein the reading of the packets includes outputting the packets read from the packet storage queues to a process module such as a CPU.

19. A computer-readable storage medium which stores a data queue control program operable to drive a computer making up a system controller to execute:
   receiving by a plurality of receiving latches packets having various numbers of words from a plurality of interfaces;
   separating on a word by word basis the packets received by the receiving latches and storing the separated packets into buffer queues of a number equal to a largest number of words of a received packet,
   storing the packets read from the buffer queues into packet storage queues of a number equal to the number of the buffer queues;
   defining in advance a plurality of types of writing formats, which are patterns for writing word data of the received packet into said buffer queues, corresponding to availabilities of the buffer queues, and, when a packet is received by one of the plurality of receiving latches, determining dynamically a writing format corresponding to a current availability of the buffer queues;
   storing separately on a word by word basis the received packets into the buffer queues, in conformity with the defined writing formats;
   storing the defined writing formats; and
   recognizing positions to store the words data based on the stored defined writing formats, and reading the packets from the packet storage queues.

20. The storage medium according to claim 19, wherein the defining of the writing formats includes defining a writing format that causes the words of the received packet to be sequentially stored into the plurality of buffer queues in order of descending availability of the buffer queues.

21. The storage medium according to claim 19, wherein the defining of the writing formats includes defining a writing format that causes the words of the received packet to be sequentially stored into the plurality of buffer queues in order of descending availability of the buffer queues when the received packet has full words.

22. The storage medium according to claim 19, wherein the defining of the writing formats includes defining a writing format that causes the words of the received packet to be sequentially stored into the plurality of buffer queues in order of descending availability of the buffer queues when the received packet has vacant words.

23. The storage medium according to claim 19, wherein the defining of the writing formats includes, when the received packet has n words, n being an arbitrary integer, which is a maximum packet length, defining a writing format that causes the n words to be sequentially stored into n buffer queues in order of descending availability of the buffer queues, and
   wherein the defining of the writing formats includes, when the received packet has words fewer than n words, defining a writing format that causes each word fewer than n words to be sequentially stored into n buffer queues in order of descending availability of the buffer queues.

24. The storage medium according to claim 19, wherein the defining of the writing formats includes, when the received packet has four (4) words, defines a writing format that causes the four (4) words to be sequentially stored into four (4) buffer queues in order of descending availability of the buffer queues, and
   wherein the defining of the writing formats includes, when the received packet has three (3) words, two (2) words or one (1) word, defining a writing format that causes each word of the three (3) words, two (2) words or one (1) word to be sequentially stored into four (4) buffer queues in order of descending availability of the buffer queues.

25. The storage medium according to claim 19,
   wherein the plurality of buffer queues consist of RAMs each having at least two (2) addresses with a size of one (1) word, and
   wherein the defining of the writing formats includes defining a writing format corresponding to an availability of a RAM configuration of the plurality of buffer queues and determining a writing format corresponding to the availability of the RAM configuration of the plurality of buffer queues at a time when the packets are received.

26. The storage medium according to claim 19,
   wherein each of the buffer queues disposed corresponding to each word of the received packets comprises a buffer queue group in a parallel arrangement of corresponding number of buffer queues to a number of the interfaces for the receiving latches, and
   wherein each of the buffer queues reads each word of the received packets for each receiving latch stored in each buffer queue group, for each of the received packets using a plurality of intervening circuits disposed corresponding to respective buffer queue groups, to store respective read words into the packet storage queues.

27. The storage medium according to claim 19,
   wherein each receiving latch receives the packets from the interfaces of resources such as a memory controller and an input/output controller, and
   wherein the reading of the packets includes outputting the packets read from the packet storage queues to a process module such as a CPU.

* * * * *